United States Patent
Saito

(10) Patent No.: US 10,040,112 B2
(45) Date of Patent: *Aug. 7, 2018

(54) METHOD FOR FORMING PRESS-FORMED PARTS WITH REDUCED SPRINGBACK

(71) Applicant: JFE STEEL CORPORATION, Tokyo (JP)

(72) Inventor: Takanobu Saito, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 631 days.

This patent is subject to a terminal disclaimer.

(21) Appl. No.: 14/421,255

(22) PCT Filed: Aug. 28, 2013

(86) PCT No.: PCT/JP2013/073723
§ 371 (c)(1),
(2) Date: Feb. 12, 2015

(87) PCT Pub. No.: WO2014/034953
PCT Pub. Date: Mar. 6, 2014

(65) Prior Publication Data
US 2015/0196950 A1    Jul. 16, 2015

(30) Foreign Application Priority Data

Aug. 31, 2012  (JP) ................. 2012-192310

(51) Int. Cl.
*B21J 5/06* (2006.01)
*B21D 22/00* (2006.01)
*B21D 22/20* (2006.01)
*B21J 13/02* (2006.01)
(Continued)

(52) U.S. Cl.
CPC ............. *B21J 5/06* (2013.01); *B21D 22/00* (2013.01); *B21D 22/20* (2013.01); *B21J 13/02* (2013.01);
(Continued)

(58) Field of Classification Search
None
See application file for complete search history.

(56) References Cited

U.S. PATENT DOCUMENTS 8,938,378 B2    1/2015   Suzuki et al.
2004/0251711 A1* 12/2004 Walther ............... B23K 26/26
                                                    296/146.5
(Continued)

FOREIGN PATENT DOCUMENTS

EP    2 333 684 A1    6/2011
JP    2003-251474 A   9/2003
(Continued)

OTHER PUBLICATIONS

Durrant et al. 'Squeeze cast aluminum reinforced with mild steel inserts', Journal of Materials Science 31 pp. 589-602, Chapman and Hall (1996).*

(Continued)

*Primary Examiner* — Mohammad Ali
*Assistant Examiner* — Bernard G Lindsay
(74) *Attorney, Agent, or Firm* — Oliff PLC

(57) ABSTRACT

A springback-reduced part formed by performing a springback reduction on a press-formed part that is formed by a press forming of a blank sheet made of a metal sheet. The springback-reduced part is formed by setting each element of an analytic model of the press-formed part to a stressed state that causes a springback, performing an optimization analysis for shape to detect a portion of the press-formed part that highly contributes to the rigidity thereof, applying a rigidity improving means on a specific portion of the press-formed part on the basis of the detected portion, and performing the press forming.

4 Claims, 54 Drawing Sheets

(51) Int. Cl.
  *B21K 7/12* (2006.01)
  *G06F 17/11* (2006.01)
  *G06F 17/50* (2006.01)

(52) U.S. Cl.
  CPC .............. *B21K 7/12* (2013.01); *G06F 17/11* (2013.01); *G06F 17/5018* (2013.01); *G06F 2217/42* (2013.01); *Y10T 29/49817* (2015.01); *Y10T 156/1002* (2015.01); *Y10T 428/12389* (2015.01)

(56) References Cited

U.S. PATENT DOCUMENTS

| | | | | |
|---|---|---|---|---|
| 2009/0295113 | A1* | 12/2009 | Inoue | B60G 7/001 280/124.134 |
| 2010/0005845 | A1 | 1/2010 | Yoshida et al. | |
| 2011/0172803 | A1* | 7/2011 | Suzuki | B21D 22/00 700/103 |
| 2011/0246150 | A1 | 10/2011 | Miyagi et al. | |
| 2015/0217356 | A1* | 8/2015 | Saito | B21D 53/88 703/6 |

FOREIGN PATENT DOCUMENTS

| | | | |
|---|---|---|---|
| JP | 2005-254279 | A | 9/2005 |
| JP | 2006-035245 | A | 2/2006 |
| JP | 2006-315063 | A | 11/2006 |
| JP | 2008-000778 | A | 1/2008 |
| JP | 2008-012570 | A | 1/2008 |
| JP | 2008000778 | * | 1/2008 |
| JP | 2008-040528 | A | 2/2008 |
| JP | 2008-246542 | A | 10/2008 |
| KR | 2010-0109820 | A | 10/2010 |

OTHER PUBLICATIONS

Oct. 22, 2016 Office Action issued in Korean Patent Application No. 10-2015-7006365.
Nov. 19, 2013 International Search Report issued in International Patent Application No. PCT/JP2013/073723.
Jul. 28, 2015 Search Report issued in European Application No. 13832374.6.
Jul. 26, 2017 Office Action issued in U.S. Appl. No. 14/421,278.

* cited by examiner

FIG. 4
(a) 
(b) 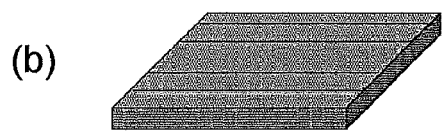
(c) 

FIG. 43
(a) 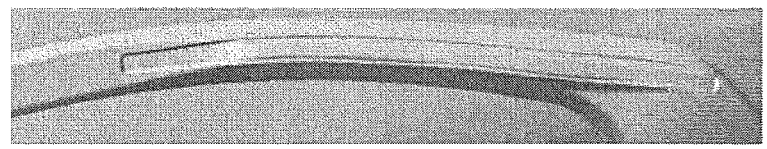
(b) 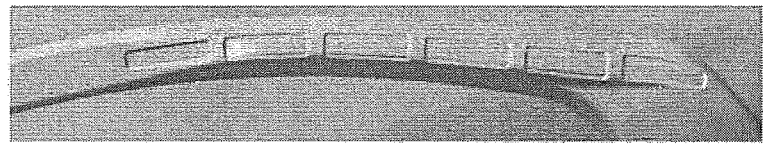

METHOD FOR FORMING PRESS-FORMED PARTS WITH REDUCED SPRINGBACK

TECHNICAL FIELD

The present invention relates to a part with reduced springback that is a press-formed part, formed by press forming a metal sheet (blank sheet) and used as a part such as an automotive part, on which a springback reduction method has been performed. The present invention also relates to a method for manufacturing the part with reduced springback.

BACKGROUND ART

In consideration of environmental problems in the automotive industry, in particular, weight reduction of automotive bodies has progressed in recent years, which requires metal sheet materials used for automotive bodies to have smaller thickness while having high strength and rigidity. In view of these requirements, high-strength steel sheets have gradually been adopted as a metal material.

When, however, a high-strength steel sheet is used, a phenomenon, specifically, a large amount of springback occurs in the steel sheet during forming. If a large amount of springback occurs in a sheet, the sheet is described as having a defective shape and fails to be assembled by joining or by other methods. Thus, a springback reduction method is an extremely important technology and various different methods have been developed.

Patent Literature 1 is taken as an example of a springback reduction method. Patent Literature 1 discloses a die for press forming with which a bending step is performed without deep drawing and a vertical-wall-portion compressing step is performed immediately after the bending step is finished. In the bending step, a metal material is processed so as to have a hat-shaped cross section. In the vertical-wall-portion compressing step, a compressive force is applied to a vertical wall portion of the metal sheet material. The bending step and the vertical-wall-portion compressing step prevent residual stress from occurring during press forming, whereby springback is reduced.

CITATION LIST

Patent Literature

[PTL 1] Japanese Unexamined Patent Application Publication No. 2005-254279.

SUMMARY OF INVENTION

Technical Problem

However, shapes of a part that can be formed by using the die for press forming disclosed in Patent Literature 1 are limited to such shapes that can be formed by the bending step and the vertical-wall-portion compressing step. An example of such shapes is a shape of a part having a hat-shaped cross section that includes a vertical wall portion and a flange portion. Thus, disadvantageously, the shape of a part that can be manufactured by using the die for press forming disclosed in Patent Literature 1 is limited to an extremely narrow range of shapes.

The present invention has been accomplished to solve the above problem and an object of the present invention is to provide various different parts on which a springback reduction method is performed regardless of the shape of the parts.

Solution to Problem

The inventors diligently studied a way of reducing springback by increasing the rigidity of a specific portion of a part, which is not the known way of reducing springback, namely, by preventing residual stress from occurring during press forming. The inventors consequently arrived at the present invention.

Specific configurations according to the present invention are as follows.

(1) A springback-reduced part according to the present invention provides a springback-reduced part formed by performing a springback reduction on a press-formed part, which is formed by a press forming of a blank sheet made of a metal sheet. The springback-reduced part is formed by setting each element of an analytic model of the press-formed part to a stressed state that causes a springback, performing an optimization analysis for shape to detect a portion of the press-formed part that highly contributes to a rigidity thereof, applying a rigidity improving means on a specific portion of the press-formed part on a basis of the detected portion, and performing the press forming.

(2) In the springback-reduced part according to (1), the rigidity improving means is applied by performing the press forming using a die that provides a specific portion of the blank sheet a protruding shape and/or a recessed shape.

(3) In the springback-reduced part according to (1), the rigidity improving means is applied to make a thickness of a specific portion of the blank sheet larger than a thickness of other portions of the blank sheet.

(4) In the springback-reduced part according to (1), the rigidity improving means is applied to make a Young's modulus of a specific portion of the blank sheet higher than a Young's modulus of other portions of the blank sheet.

(5) In the springback-reduced part according to (1), the rigidity improving means is applied to bond another sheet to a specific portion of the blank sheet.

(6) A method for manufacturing the springback-reduced part according to the present invention provides a method for manufacturing the springback-reduced part according to any one of (1) to (5). The method includes an analytic model forming step for forming an analytic model of a press-formed part with plane elements and/or solid elements; a stressed-state setting step for setting each of the elements of the analytic model to a stressed state that causes a springback; a rigidity-contributable-portion detecting step for performing an optimization analysis for shape on the analytic model with the elements set to the stressed state in the stressed-state setting step to detect a portion of the press formed part that highly contributes to a rigidity thereof; a rigidity improving step for performing a rigidity improving method on a specific portion of the press-formed part on a basis of the portion detected in the rigidity-contributable-portion detecting step; and a press-forming step for performing a press forming on the blank sheet.

(7) In the method according to (6), the rigidity improving method in the rigidity improving step is performed by fabricating a die that provides the specific portion of the blank sheet a protruding shape and/or a recessed shape.

(8) In the method according to (6), the rigidity improving method in the rigidity improving step is performed by removing the specific portion of the blank sheet to make a removed portion and fitting a member having a thickness larger than a thickness of the specific portion of the blank sheet into the removed portion such that the member is integrated with the blank sheet.

(9) In the method according to (6), the rigidity improving method in the rigidity improving step is performed by removing the specific portion of the blank sheet to make a removed portion and fitting a member having a Young's modulus higher than a Young's modulus of the specific portion of the blank sheet into the removed portion such that the member is integrated with the blank sheet.

(10) In the method according (6), the rigidity improving method in the rigidity improving step is performed by bonding another sheet to the specific portion of the blank sheet.

Advantageous Effects of Invention

The springback-reduced part according to the present invention is formed by performing an optimization analysis for shape while each element of an analytic model of the press-formed part is set to a stressed state that cause springback so as to detect a portion that highly contributes to the rigidity and by performing press forming such that a means for improving the rigidity is applied on a specific portion of the press-formed part on the basis of the detected portion. Thus, springback can be reduced.

In addition, the method for manufacturing a springback-reduced part according to the present invention makes it possible to find on which portion the means for improving the rigidity should be applied and thus press forming may be performed on the basis of the finding. The method for press forming may be any method and the method for press forming is thus applicable to press-formed-part having any shapes.

Moreover, in the case where the springback-reduced part is an automotive part, improvement in the rigidity of each part is also effective for improving the rigidity of the vehicle body.

BRIEF DESCRIPTION OF DRAWINGS

FIG. 4 is a diagram illustrating examples of how elements are used in the method for manufacturing a springback-reduced part illustrated in FIG. 1.

FIG. 43 is a diagram illustrating comparative examples for confirming the effect of the springback reduction method according to Example 3 of the present invention.

DESCRIPTION OF EMBODIMENTS

First Embodiment

A springback-reduced part according to an embodiment of the present invention is manufactured in the following manner. Elements of an analytic model of a press-formed part are set to stressed states that cause a springback and an optimization analysis for shape is performed to detect a portion that highly contributes to the rigidity (rigidity contributable portion). The press-formed part is then subjected to press-forming such that a rigidity improving means is performed on a specific portion of the press-formed part on the basis of the detected rigidity contributable portion.

Figure 1:
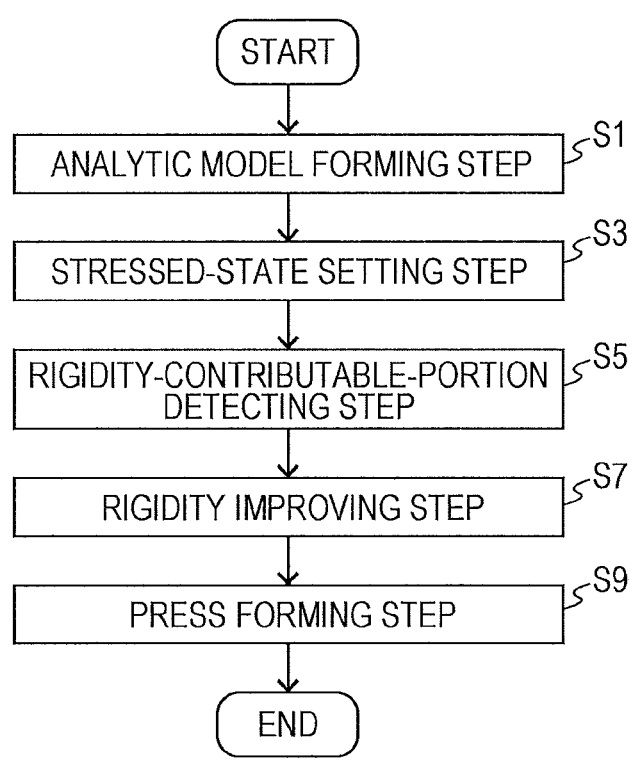
FIG. 1 is a flow chart illustrating a process of a method for manufacturing a springback-reduced part according to a first embodiment of the present invention.

Referring now to the flow chart illustrated in FIG. 1, a method for manufacturing a springback-reduced part is described.

Firstly, an analytic model forming step S1, a stressed-state setting step S3, and a rigidity-contributable-portion detecting step S5 are performed. In the analytic model forming step S1, an analytic model of the press-formed part is formed with plane elements and/or solid elements. In the stressed-state setting step S3, elements of the analytic model thus formed are set to stressed states that cause springback in the analytic model. In the rigidity-contributable-portion detecting step S5, the analytic model that has been set to the stressed state in the stressed-state setting step S3 is subjected to an optimization analysis for shape to detect a portion that highly contributes to the rigidity.

Subsequently, a rigidity improving step S7 is performed, in which a means is applied to improve the rigidity of a specific portion on the basis of the portion detected in the rigidity-contributable-portion detecting step S5.

Thereafter, a press-forming step S9 is performed, in which a blank sheet is press formed.

Since the above-described analytic model forming step S1, stressed-state setting step S3, and rigidity-contributable-portion detecting step S5 are performed by an analyzing apparatus 1 using a finite element method, the analyzing apparatus 1 is firstly described in detail below referring to FIG. 2 to FIG. 4.

Figure 2:
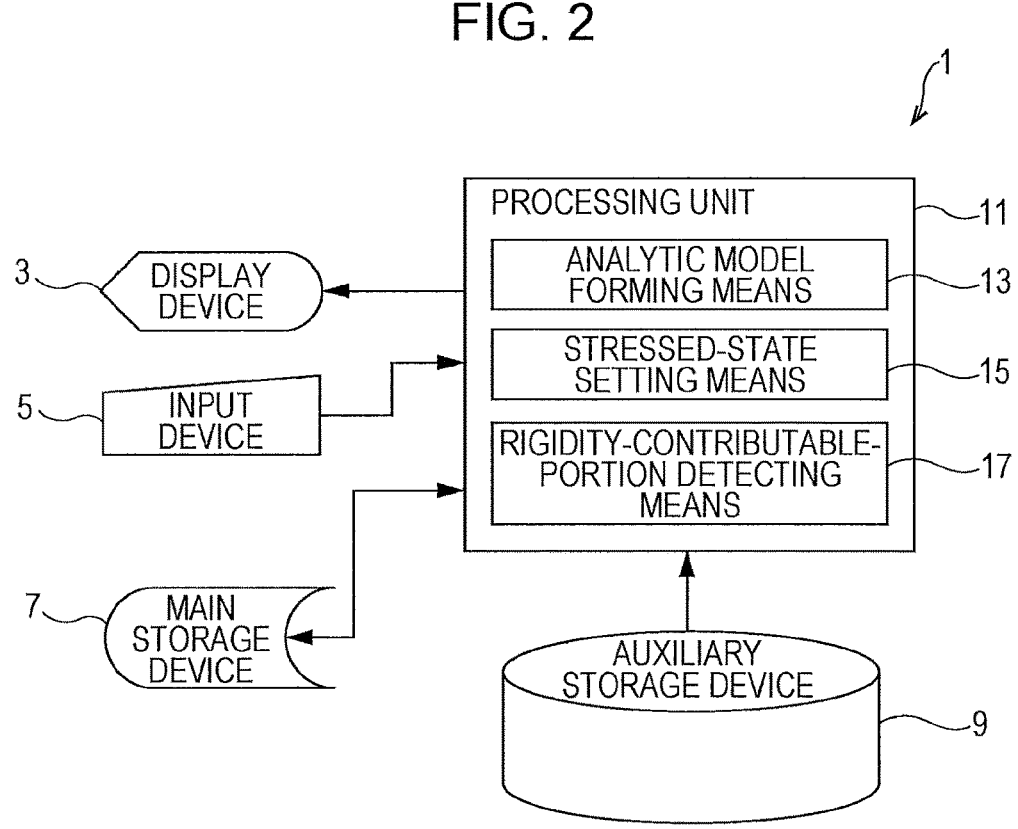
FIG. 2 is a diagram illustrating an analyzing apparatus used for the method for manufacturing a springback-reduced part illustrated in FIG. 1.

The analyzing apparatus 1 according to the embodiment is, for example, a personal computer (PC) and includes a display device 3, an input device 5, a main storage device 7, an auxiliary storage device 9, and a processing unit 11, as illustrated in FIG. 2.

The display device 3, the input device 5, the main storage device 7, and the auxiliary storage device 9 are connected to the processing unit 11 and operate according to commands of the processing unit 11. The display device 3 is used for displaying calculation results or for other purposes, and is, for example, a liquid crystal monitor. The input device 5 is used when, for example, an operator inputs information. The input device 5 includes a keyboard and a mouse. The main storage device 7 is used for temporarily storing data used by the processing unit 11, for calculations, and for other purposes. The main storage device 7 is, for example, a random-access memory (RAM). The auxiliary storage device 9 is used for storing data or for other purposes, and is, for example, a hard disk.

The processing unit 11 is, for example, a central processing unit (CPU) of a PC or other devices. The processing unit 11 includes an analytic model forming means 13, a stressed-state setting means 15, and a rigidity-contributable-portion detecting means 17. These means are implemented when the CPU or another device executes predetermined programs. These means will be described below.

<Analytic Model Forming Means>

The analytic model forming means 13 forms an analytic model of a part with plane elements (shell elements), solid elements, or both plane elements and solid elements. FIG. 4 illustrates an example of a method for using plane elements and solid elements. FIG. 4 illustrates analytic models formed for a flat-surface shape. FIG. 4(a) is an analytic model formed by using only plane elements. FIG. 4(b) is an analytic model formed by using only solid elements. FIG. 4(c) is an analytic model formed by using both plane elements and solid elements such that the solid elements are disposed on the top surface of the plane elements.

When an optimization analysis for shape (to be described in detail, below) is performed on the analytic models formed by using the elements illustrated in FIG. 4(a) and FIG. 4(b) such that unneeded elements are eliminated, no elements are left in the resultant model. When an optimization analysis for shape is performed on the analytic model formed by using the elements illustrated in FIG. 4(c), only the solid elements on the top surface of the plane element are eliminated.

Here, analytic models formed by any of the methods of using plane and/or sold elements may be employed in the present invention.

<Stressed-State Setting Means>

The stressed-state setting means 15 sets each element of the analytic model formed by the analytic model forming means 13 to the stressed state that causes springback.

As an example of a method for setting elements to the stressed states, while a part of the analytic model is constrained, various types of loads are applied to another part of the analytic model, such as a bending load, a torsional load, or both a bending load and a torsional load. The analytic model is set to the stressed state by applying such a load or loads. This is one of the methods of setting each element of the analytic model to the stressed state. An alternative method for setting each element to the stressed state is to directly transfer (map) a separately produced stressed state to each element. The separately produced stressed state may be, for example, the bottom-dead-centre state (in the state before being separated from the die) produced by a press forming analysis.

<Rigidity-Contributable-Portion Detecting Means>

The rigidity-contributable-portion detecting means 17 performs an optimization analysis for shape on the analytic model set to the stressed state by the stressed-state setting means 15 to detect a portion that highly contributes to the rigidity.

For example, a topology optimization analysis is employed as the optimization analysis for shape. The topology optimization analysis is an analytic method that includes analyzing an analytic model of a target part to leave minimum elements required for satisfying given analytic conditions (stressed state, loads, constraints, volume percentage, and the like) and determining a portion including only the minimum elements as an optimal portion. Assume if the analytic conditions are set, for example, to find "a portion that most highly contributes to the rigidity under specific load constraint conditions and whose volume percentage of the entire portion is 20% of the initial shape". Then, elements of the analytic model that are not required to satisfy the analytic conditions are eliminated until the volume percentage of the remaining portion becomes 20% of the initial state. Finally, a portion including only the minimum elements is left. Specifically, for example, the amount of deformation is studied assuming that each element included in the analytic model is eliminated. Then, elements are eliminated in ascending order of a change in the amount of deformation before and after the elimination. This operation is performed until the volume percentage of the remaining portion becomes 20% of the initial state. This remaining portion is a portion that highly contributes to the rigidity (rigidity contributable portion).

Besides the topology optimization analysis, the optimization analysis for shape may be an optimization analysis such as a topography optimization analysis or a numerical optimization analysis.

Referring now to the flow chart illustrated in FIG. 1 and appropriate drawings as needed, the processing flow of the method for manufacturing a springback-reduced part using the analyzing apparatus 1 is described.

Figure 3:
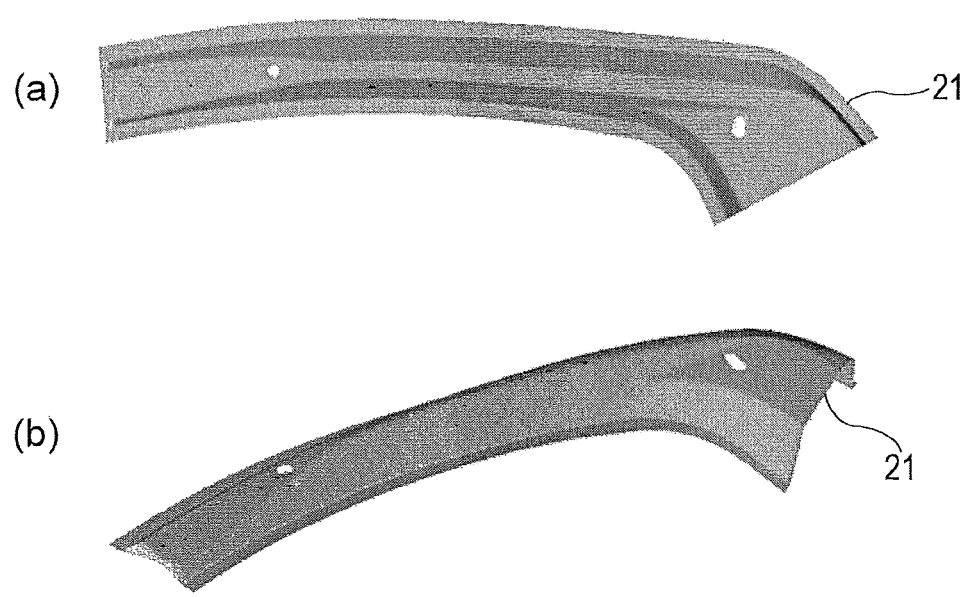
FIG. 3 is a diagram illustrating a part that is to be formed with the method for manufacturing a springback-reduced part illustrated in FIG. 1.

Here, an A pillar 21, which is a part included in a vehicle body 165 (see FIG. 46) as illustrated in FIG. 3, is taken as an example of a part to be analyzed. And a case where the springback reduction method is performed on an A pillar 21 is described below. FIG. 3(a) is a plan view of the A pillar 21 and FIG. 3(b) is a perspective view of the A pillar 21. As illustrated in FIG. 3, the A pillar 21 has a hat-shaped cross section.

Primary types of deformations that can occur due to springback are a bending deformation and a torsional deformation. Thus, in this embodiment, three types of springback, that is, a springback against a bending deformation, a springback against a torsional deformation, and a springback against a bending-torsional-combined deformation, are assumed as examples of the springback. Accordingly, with the method for manufacturing a springback-reduced part according to this embodiment, three types of springback-reduced parts are manufactured in which a springback against the bending deformation, a springback against the torsional deformation, and a springback against the bending-torsional-combined deformation are respectively reduced.

Referring now to FIG. 5 to FIG. 9, each step (the analytic model forming step S1, the stressed-state setting step S3, the rigidity-contributable-portion detecting step S5, the rigidity improving step S7, and the press-forming step S9) of the method for reducing springback will be described in detail below.

<Analytic Model Forming Step>

Figure 5:
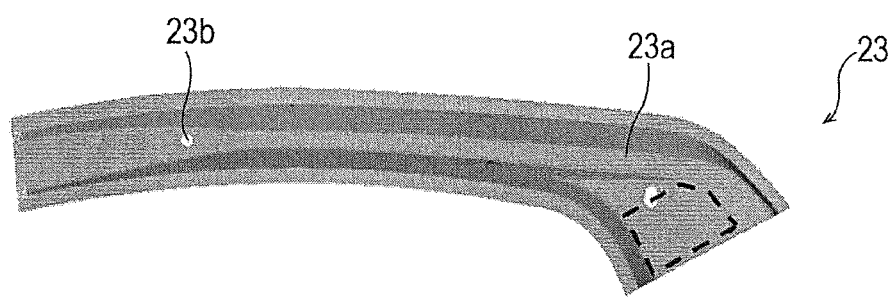
FIG. 5 is a diagram illustrating a stressed-state setting step in the method for manufacturing a springback-reduced part illustrated in FIG. 1 (part 1).
Figure 6:
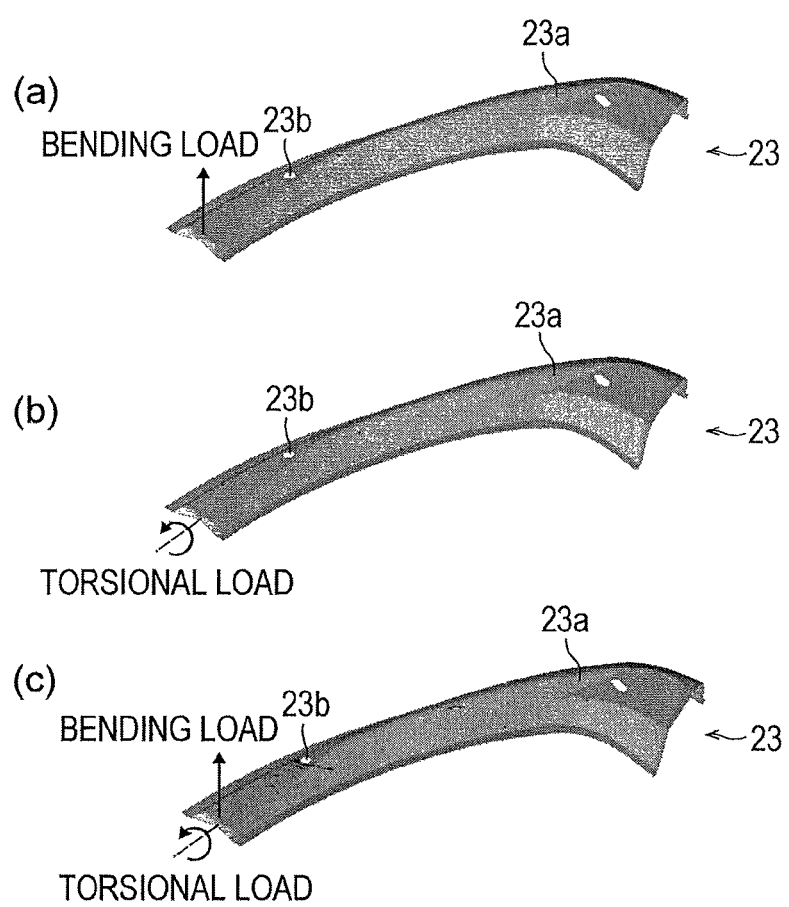
FIG. 6 is a diagram illustrating the stressed-state setting step in the method for manufacturing a springback-reduced part illustrated in FIG. 1 (part 2).

Firstly, in the analytic model forming step S1, the analytic model forming means 13 forms an analytic model 23 of the A pillar 21 (FIG. 3), which is a part to be analyzed (FIG. 5). In this embodiment, for example, nine types of analytic models 23 are formed in total in accordance with the assumed springback types and in accordance with the three types of use of elements described with reference to FIG. 4 for each springback type.

<Stressed-State Setting Step>

Subsequently, in the stressed-state setting step S3, the stressed-state setting means 15 sets each element of the analytic models 23 thus formed to the stressed state.

An example of the method for setting the element to the stressed state includes, while constraining a part of the analytic models 23, applying a bending load and/or a torsional load to another part of the analytic models 23 so that each element of the analytic models 23 is brought into the stressed state. This method for setting each element of the analytic models 23 to the stressed state is described.

Regarding the constraint conditions, an upper surface of an end portion (an area surrounded by a dotted line in FIG. 5) is constrained in all the analytic models 23 as illustrated in FIG. 5.

The load conditions are set in the following manner. When parts are formed by press forming, a specific type of springback occurs in a specific direction in respective parts. Thus, each part is subjected to a press-forming analysis in advance to find what type of springback occurs and the load condition is set on the basis of the direction of the springback thus found to occur. In this embodiment, the load conditions are set in the following manner. In the case of the bending deformation, as illustrated in FIG. 6(a), a bending load is applied to the analytic models 23 such that an end portion opposite the constrained end portion is bent upward. In the case of the torsional deformation, as illustrated in FIG. 6(b), a torsional load is applied to the analytic models 23 such that the end portion opposite the constrained end portion is twisted around the longitudinal direction of the A pillar 21. In the case of the bending-torsional-combined deformation, as illustrated in FIG. 6(c), both loads of FIG. 6(a) and FIG. 6(b) are applied to the analytic models 23 in combination.

The above-described examples are simple examples made assuming a bending deformation, a torsional deformation, and a bending-torsional-combined deformation as causes of springback. Alternatively, analyses can be performed assuming a deformation due to an actual springback.

In the above load conditions, a bending load, a torsional load, and a bending-torsional-combined load are applied. It is also possible to perform a press-forming analysis and set boundary conditions to the elements by mapping the distribution of the stress at the bottom dead center state produced by the press-forming analysis to the elements that constitute the shape of the part. Alternatively, it is also possible to use the above-described analytic conditions (constrains and loads) in combination.

<Rigidity-Contributable-Portion Detecting Step>

Subsequently, in the rigidity-contributable-portion detecting step S5, an optimization analysis for shape is performed on each analytic model 23 to which the stressed state is set in the stressed-state setting step S3 so that the rigidity contributable portion is detected. In this embodiment, the volume percentage that is to be left is set to 20% of the initial shape.

Figure 7:
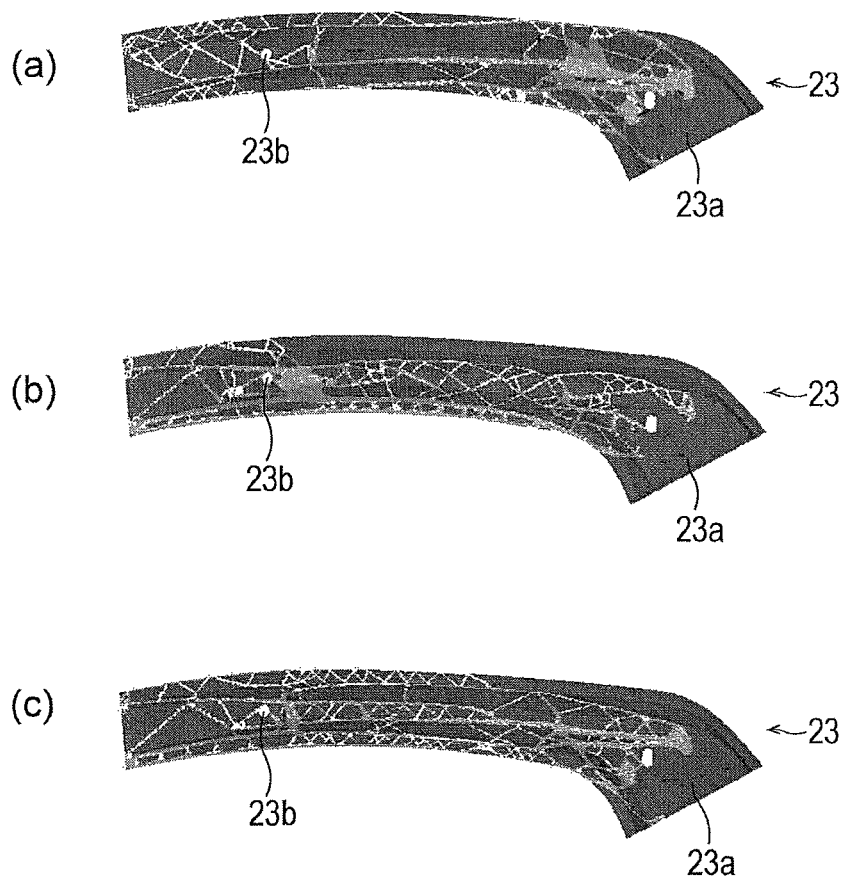
FIG. 7 is a diagram illustrating results obtained after the rigidity-contributable-portion detecting step in the method for manufacturing a springback-reduced part illustrated in FIG. 1 is performed (part 1).
Figure 8:
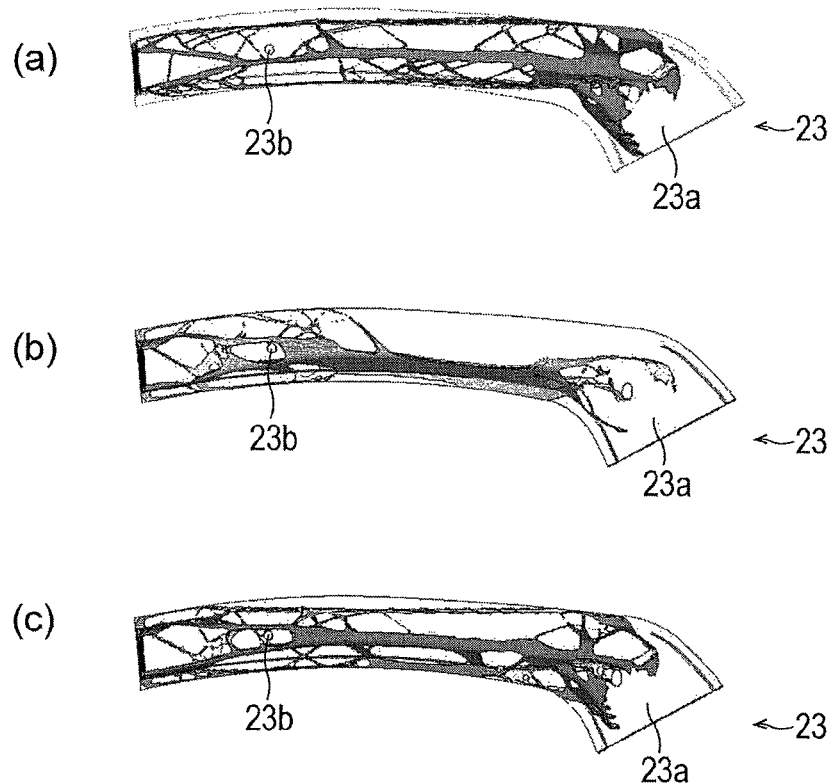
FIG. 8 is a diagram illustrating results obtained after the rigidity-contributable-portion detecting step in the method for manufacturing a springback-reduced part illustrated in FIG. 1 is performed (part 2).
Figure 9:
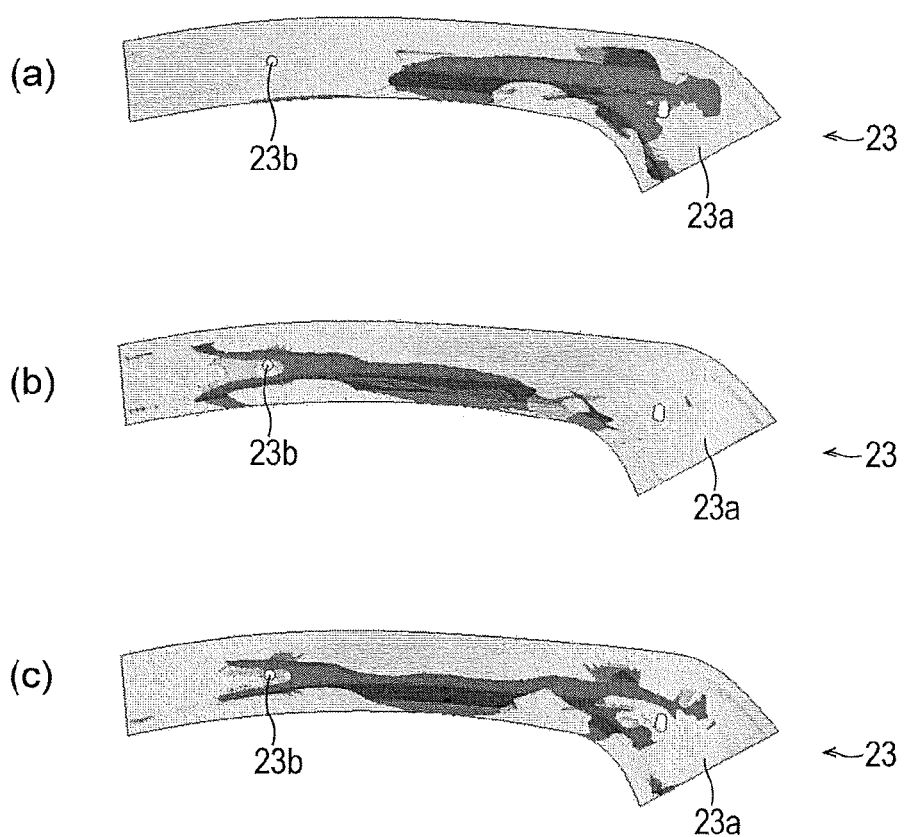
FIG. 9 is a diagram illustrating results obtained after the rigidity-contributable-portion detecting step in the method for manufacturing a springback-reduced part illustrated in FIG. 1 is performed (part 3).

FIG. 7 to FIG. 9 illustrate results of an optimization analysis for shape.

FIG. 7 illustrates results obtained after analyzing the analytic models 23 formed with plane elements alone. FIG. 7(a) illustrates a result of an optimization analysis for shape against the bending deformation (bending load), FIG. 7(b) illustrates a result of an optimization analysis for shape against the torsional deformation (torsional load), and FIG. 7(c) illustrates a result of an optimization analysis for shape against the bending-torsional-combined deformation (bending-torsional-combined load). Elements that remain as the results of optimization analyses (rigidity contributable portions) are marked with thin grey.

As illustrated in FIG. 7, the remaining portions (rigidity contributable portions) are reticulated under all the load conditions. FIG. 7(a) shows that a large part is left near the constrained portion described with reference to FIG. 5. In FIG. 7(b), a large part is left near a punched hole 23b. In FIG. 7(c), the rigidity contributable portion extends more widely than those in the cases illustrated in FIG. 7(a) and FIG. 7(b).

FIG. 8 illustrates results obtained by analyzing the analytic models 23 formed with solid elements alone. As in the case of FIG. 7, FIG. 8(a) illustrates a result of an optimization analysis for shape against the bending deformation (bending load), FIG. 8(b) illustrates a result of an optimization analysis for shape against the torsional deformation (torsional load), and FIG. 8(c) illustrates a result of an optimization analysis for shape against the bending-torsional-combined deformation (bending-torsional-combined load). In FIG. 8, the rigidity contributable portions are marked with thick grey.

FIG. 9 illustrates results obtained by analyzing the analytic models 23 formed with both plane elements and solid elements. As in the cases illustrated in FIG. 7 and FIG. 8, FIG. 9(a) illustrates a result of an optimization analysis for shape against the bending deformation (bending load), FIG. 9(b) illustrates a result of an optimization analysis for shape against the torsional deformation (torsional load), and FIG. 9(c) illustrates a result of an optimization analysis for shape against the bending-torsional-combined deformation (bending-torsional-combined load). In FIG. 9, portions marked with thin grey indicate portions including only the plane element and portions marked with thick grey indicate rigidity contributable portions. The rigidity contributable portions are portions in which solid elements remain on the top surface of the plane element.

FIG. 9 shows that the rigidity contributable portions remain without being reticulated, as compared with the cases illustrated in FIG. 7 and FIG. 8.

<Rigidity Improving Step>

Subsequently, in the rigidity improving step S7, a rigidity improving means is applied to the A pillar 21 on the basis of the rigidity contributable portion detected in the rigidity-contributable-portion detecting step S5.

A specific example of the rigidity improving means is to use a die for shaping a specific portion of a blank sheet into a protruding shape and/or a recessed shape.

The outline shape of the rigidity contributable portion may be used as it is for forming a portion into the protruding shape and/or the recessed shape. If the outline shape is too complex to be used as it is, a rough shape of the outline shape may be used, instead. Consequently, the rigidity of the portion shaped into a protruding shape and/or a recessed shape can be improved. If the rigidity contributable portion extends to a wide range, in order to shape a portion of a blank sheet into a protruding shape and/or a recessed shape, a waveform bead that extends in the load direction may be additionally provided within the outline shape of the rigidity contributable portion.

<Press-Forming Step>

Subsequently, in the press-forming step S9, springback-reduced parts are manufactured by utilizing the rigidity improving means applied in the rigidity improving step S7, for example, by press forming a blank sheet using the above-described die for shaping a specific portion of the blank sheet into a protruding shape and/or a recessed shape.

The present invention can thus be embodied as a method for manufacturing a die for press forming a blank sheet to form a press-formed part such that the springback reduction method is to be performed on the part. The method includes setting elements of an analytic model of the press-formed part to stressed states that causes springback, performing an optimization analysis for shape to detect a portion that highly contributes to the rigidity, and manufacturing a press-forming die so as to shape a specific portion of the blank sheet, on the basis of the detected portion, into a protruding shape and/or a recessed shape when the blank sheet is press formed.

As described above, the springback-reduced part according to the first embodiment of the present invention is manufactured in the following manner. Each element of an analytic model 23 of a press-formed part (A pillar 21) is set to the stressed state that causes springback and an optimization analysis for shape is performed to detect a portion that highly contributes to the rigidity (rigidity contributable portion). A press-formed part is manufactured by press forming such that a rigidity improving means is applied on a specific portion of the press-formed part on the basis of the detected rigidity contributable portion. Consequently, the rigidity of the rigidity contributable portion can be improved and the springback in the A pillar 21 can be reduced.

Since the rigidity of the A pillar 21 is improved, assembling the A pillar into a vehicle body, which is an exemplary structure to be constructed with the A pillar 21, can improve the rigidity of the vehicle body.

Second Embodiment

The method for using a die for shaping a specific portion of a blank sheet into a protruding shape and/or a recessed shape as a rigidity improving means is described thus far. However, in the present invention, a the rigidity improving means is not limited to this means.

Alternatively, for example, the means may be based on the following idea.

A press-formed part is manufactured by press forming a blank sheet, which is obtained by blanking a flat sheet of base material in an opened shape (blank shape) of the press-formed part. Thus, by improving the rigidity of a specific portion of the blank sheet, the rigidity of the specific portion of the press-formed part can be improved. The specific portion of the blank sheet whose rigidity is to be improved may be a portion directly corresponding to the rigidity contributable portion of the press-formed part obtained after the press forming. If the specific portion is too complex to be used as it is, a portion corresponding to a rough outline of the rigidity contributable portion may be used as the specific portion.

Figure 10:
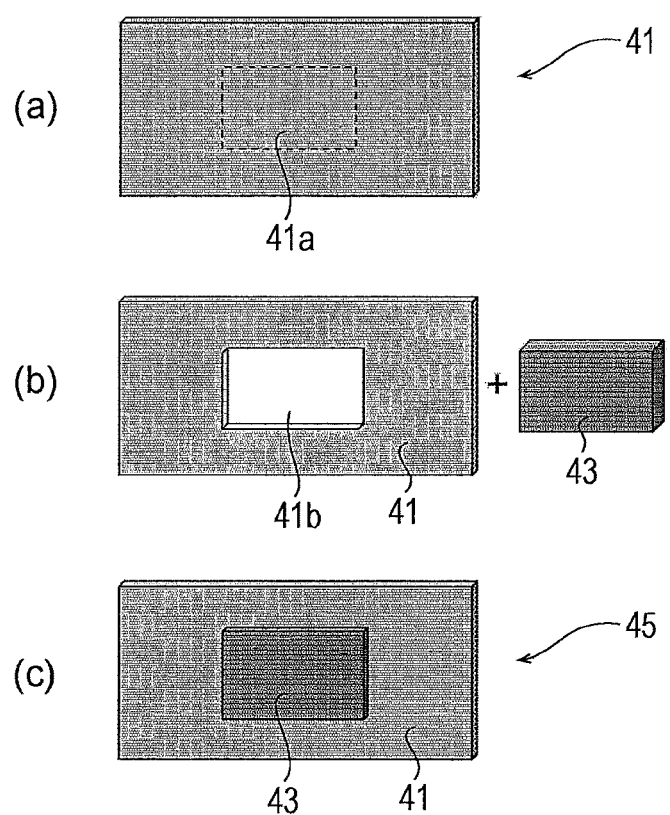
FIG. 10 is a diagram illustrating an example of a method for improving the rigidity in the method for manufacturing a springback-reduced part according to a second embodiment of the present invention.
Figure 11:
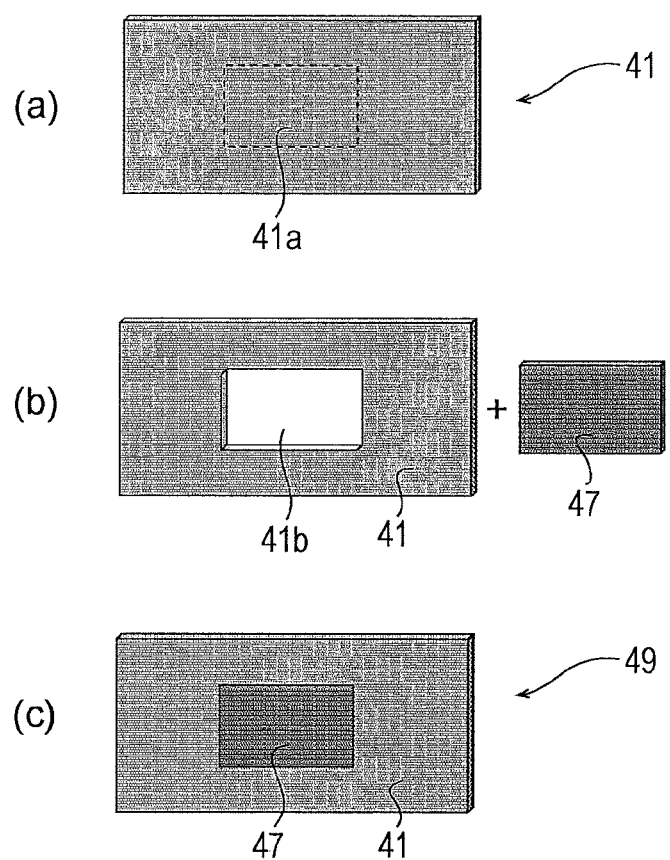
FIG. 11 is a diagram illustrating another example of the method for improving the rigidity, different from the example illustrated in FIG. 10.
Figure 12:
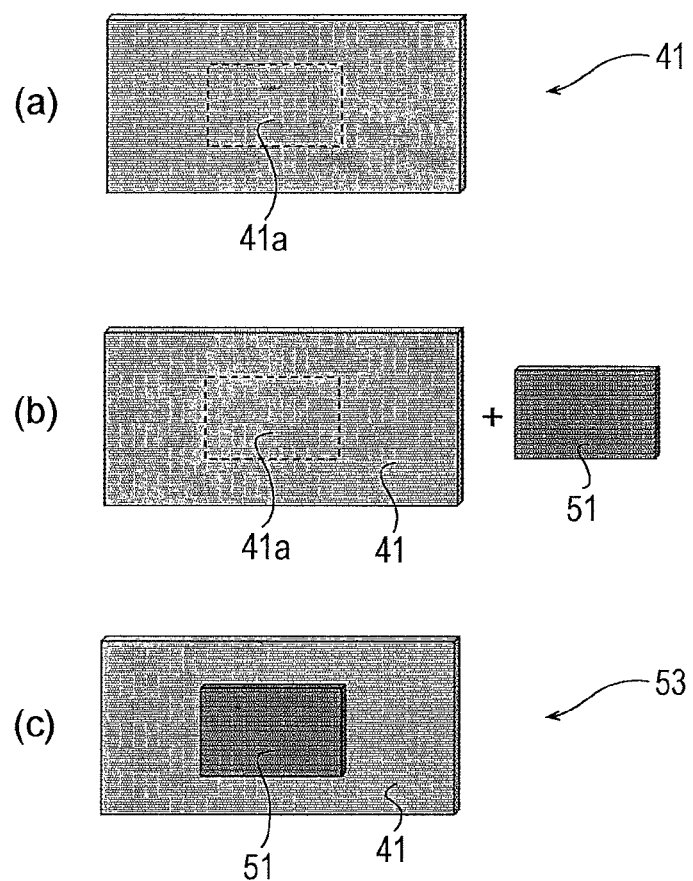
FIG. 12 is a diagram illustrating another example of the method for improving the rigidity, different from the examples illustrated in FIG. 10 and FIG. 11.

Examples of methods for improving the rigidity of a specific portion of a blank sheet include increasing the sheet thickness of the specific portion, increasing the Young's modulus of the specific portion, and bonding another sheet to the specific portion. These means will be described in detail below referring to FIG. 10 to FIG. 12 using a rectangular sheet member as a blank sheet 41.

In the method for increasing the thickness of a specific portion 41a of the blank sheet 41, for example, the specific portion 41a (see FIG. 10(a)) of the blank sheet 41 is blanked to form a blanked hole 41b. A sheet member 43, made of a thicker sheet having the same shape as the specific portion 41a, is fitted into the blanked hole 41b (see FIG. 10(b)) and joined to the blank sheet 41 by laser welding or by other means. Thereby, a so-called tailored blank sheet 45 (see FIG. 10(c)) is formed, which is used in this method. When the tailored blank sheet 45 thus formed is press formed, the specific portion 41a of the press-formed part can have a larger thickness, so that the rigidity of the specific portion 41a can be improved.

In the method for increasing the Young's modulus of the specific portion 41a of the blank sheet 41, the specific portion 41a (see FIG. 11(a)) of the blank sheet 41 is blanked to form a blanked hole 41b as, for example, in the above-described case of increasing the thickness. A different sheet member 47 having a higher Young's modulus and the same shape as the specific portion 41a is fitted into the blanked hole 41b (see FIG. 11(b)) and joined to the blank sheet 41 by laser welding or by other means. Thereby, a tailored blank sheet 49 (see FIG. 11(c)) is formed, which is used in this method. When the tailored blank sheet 49 thus formed is press formed, the specific portion 41a of the press-formed part can have a higher Young's modulus, so that the rigidity of the specific portion 41a can be improved.

In the method for bonding another sheet to the specific portion 41a of the blank sheet 41, a sheet member 51 made of another sheet material and having the same shape as the specific portion 41a is joined or bonded to the specific portion 41a (see FIG. 12(a)) of the blank sheet 41 by welding or by an adhesive agent (see FIG. 12(b)). Thereby, a reinforced blank sheet 53 (see FIG. 12(c)) is formed, which is used in this method. When the reinforced blank sheet 53 thus formed is press formed, the specific portion 41a is reinforced and a press-formed part having an improved rigidity can be obtained.

Some of the above-described methods of improving the rigidity of the specific portion 41a of the blank sheet 41 may be appropriately selected to be combined together. For example, a sheet member having a large thickness and a higher Young's modulus may be bonded to the specific portion 41a. Then, the specific portion 41a of the blank sheet thus formed (a tailored blank sheet or a reinforced blank sheet) may be press formed using a die for shaping the specific portion 41a into a protruding shape and/or a recessed shape.

In this manner, to improve a rigidity of the rigidity contributable portion of the press-formed part, it is only required to improve a rigidity of the rigidity contributable portion of the blank sheet.

The shape of the blank, which is an opened shape of a press-formed part, can be obtained through a so-called analysis of reverse press forming that opens a press-formed part into a state of a flat sheet. In addition, analysis of reverse press forming shows which part of the shape before the analysis corresponds to which part of the shape after the analysis. In other words, the analysis of reverse press forming of a press-formed part shows which part of the blank sheet corresponds to the rigidity contributable portion of the press-formed part.

By improving a rigidity of the rigidity contributable portion of the blank sheet thus obtained, a rigidity of the rigidity contributable portion of the press-formed part after press forming can be improved.

Thus, the present invention can be embodied as a method for manufacturing a blank sheet on which reduction of a springback of a press-formed part to be formed by press forming has been performed. The method includes setting each element of an analytic model of the press-formed part to a stressed state that causes a springback, performing an optimization analysis for shape, detecting a portion of the press-formed part that highly contributes to a rigidity thereof, and applying a rigidity improving means on a specific portion of the blank sheet on the basis of the detected portion.

The above-described method for manufacturing a blank sheet can be embodied to include, as a method for improving rigidity, increasing a thickness of the specific portion of the blank sheet larger than the thickness of other portions of the blank sheet, increasing Young's modulus of the specific portion of the blank sheet compared to Young's modulus of other portions of the blank sheet, or bonding another sheet to the specific portion of the blank sheet.

Referring to FIG. 13 to FIG. 34, several examples of specific parts on which a method for improving the rigidity of a specific portion of a blank sheet has been performed will be described. Examples of such parts include an A pillar 21, described in the first embodiment, a B pillar 61 (see FIG. 21(a)) and a shock tower RF 63 (see FIG. 28(a)), which are examples of other parts of a vehicle body 165 (see FIG. 50 and FIG. 54).

Firstly, analytic model 23 of the A pillar 21 is formed with both plane elements and solid elements, and the analytic model 23 is subjected to an optimization analysis for shape with consideration of the bending-torsional-combined deformation (bending-torsional-combined load). Referring to FIG. 13 to FIG. 20, examples of improving the rigidity of the rigidity contributable portion obtained by the analysis are described.

Figure 13:
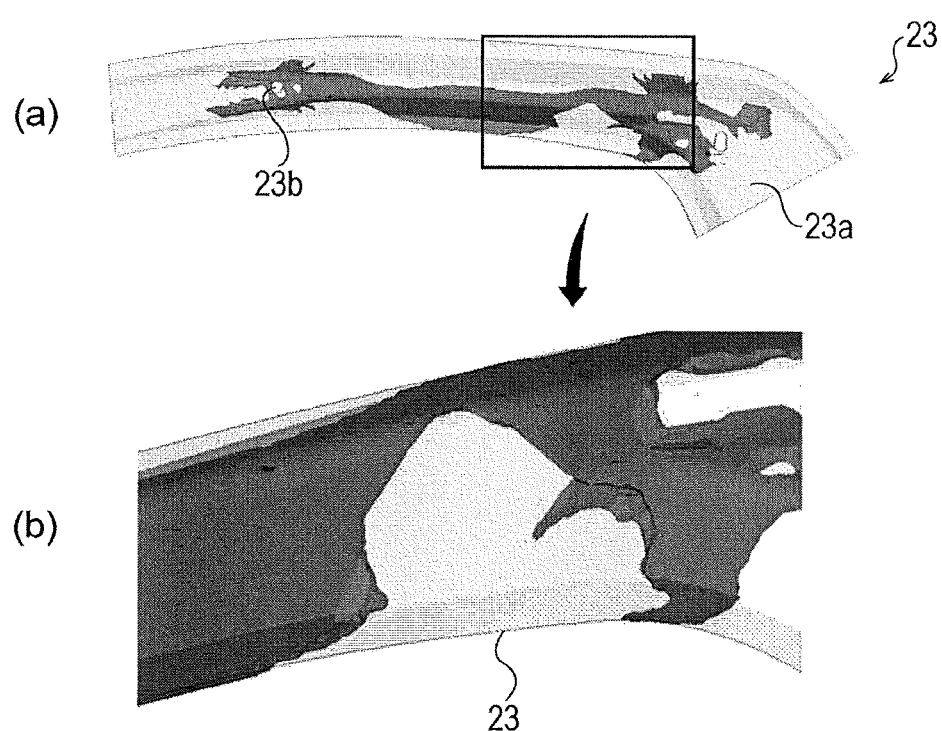
FIG. 13 is a diagram illustrating a result obtained after performing, on an A pillar, a rigidity-contributable-portion detecting step in the method for manufacturing a springback-reduced part according to the second embodiment of the present invention.

FIG. 13 illustrates a result of an optimization analysis for shape. FIG. 13(a) is a plan view of the analytic model 23 after performing the rigidity-contributable-portion detecting step S5 (the same as the one illustrated in FIG. 9(c)) and FIG. 13(b) illustrates a portion surrounded by a square of FIG. 13(a) in an enlarged manner in a perspective view as in the case of FIG. 3(b). The rigidity contributable portion is marked with thick grey.

Figure 14:
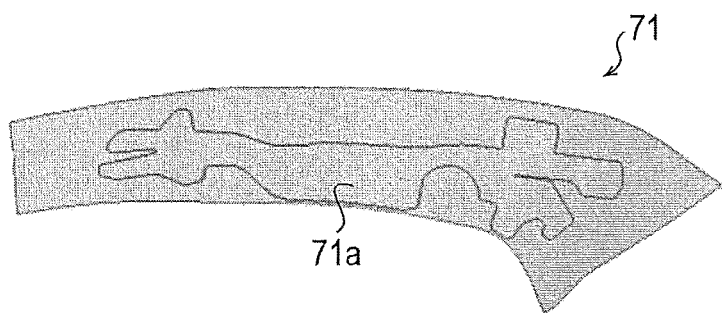
FIG. 14 is a diagram illustrating an example of a method for improving the rigidity on the basis of the result obtained after performing the rigidity-contributable-portion detecting step illustrated in FIG. 13 (part 1).
Figure 15:
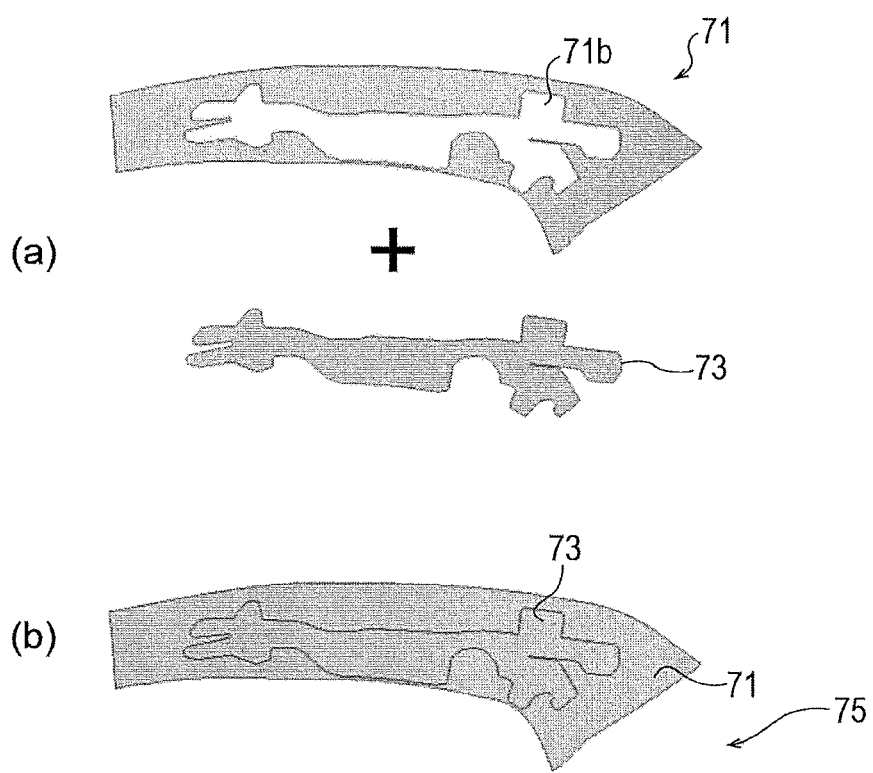
FIG. 15 is a diagram illustrating an example of a method for improving the rigidity on the basis of the result obtained after performing the rigidity-contributable-portion detecting step illustrated in FIG. 13 (part 2).

FIG. 14 illustrates the state of the analytic model 23 subjected to an analysis of reverse press forming and opened in a flat state (blank sheet 71). A portion surrounded by a line in the blank sheet 71 is a rigidity contributable portion 71a of the blank sheet 71. In FIG. 14, the shape of the rigidity contributable portion 71a of the blank sheet 71 corresponds to the outline shape of the rigidity contributable portion of the analytic model 23. The thickness of the blank sheet 71 is 1.4 mm.

The following describes examples of improving the rigidity of the rigidity contributable portion 71a of the blank sheet 71 thus obtained by increasing the thickness, by increasing the Young's modulus, and by bonding another sheet.

In the case of increasing the thickness, the rigidity contributable portion 71a of the blank sheet 71 is blanked as illustrated in FIG. 15(a), whereby a blanked hole 71b is formed. A sheet member 73 having the same shape as the rigidity contributable portion 71a and a thickness of two times as thick as the thickness of the blank sheet 71 (1.4 mm×2=2.8 mm) is fitted into the blanked hole 71b and welded to the blank sheet 71 to form a tailored blank sheet 75 (see FIG. 15(b)).

Figure 16:
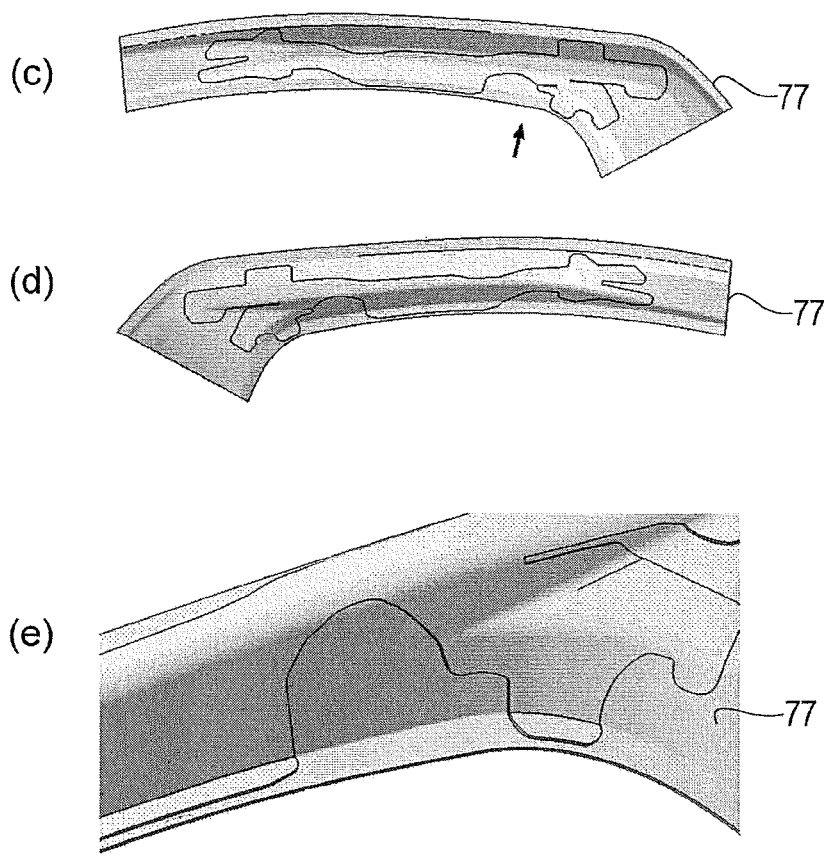
FIG. 16 is a diagram illustrating an example of a method for improving the rigidity on the basis of the result obtained after performing the rigidity-contributable-portion detecting step illustrated in FIG. 13 (part 3).
Figure 17:
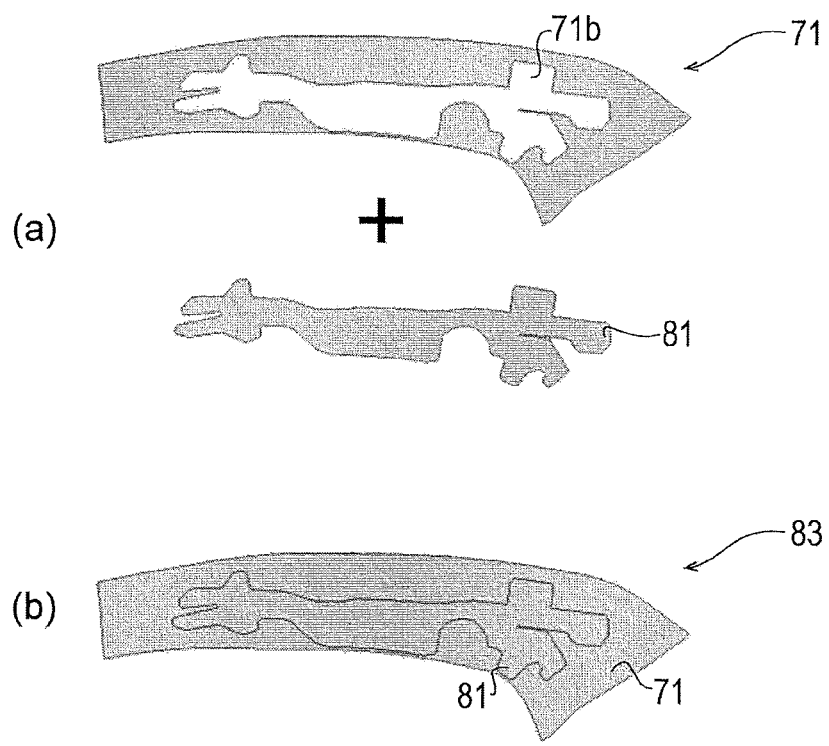
FIG. 17 is a diagram illustrating an example of a method for improving the rigidity on the basis of the result obtained after performing the rigidity-contributable-portion detecting step illustrated in FIG. 13 (part 4).

FIG. 16 illustrates a press-formed part 77 formed by press forming the tailored blank sheet 75 thus formed. FIG. 16(c) is a plan view of the press-formed part 77, FIG. 16(d) is a bottom view of the press-formed part 77, and FIG. 16(e) is a perspective view of the press-formed part 77 viewed in a direction of an arrow illustrated in FIG. 16(c). As illustrated in FIG. 16(e), the press-formed part 77 has a stepped portion due to a difference between the thickness of the blank sheet 71 and that of the sheet member 73 along the outline shape of the rigidity contributable portion 71a.

In the case of increasing the Young's modulus, as illustrated in FIG. 17(a), a sheet member 81, which has the same shape as the rigidity contributable portion 71a, the same thickness as the blank sheet 71, and a higher Young's modulus, is fitted into the blanked hole 71b of the blank sheet 71 and welded to the blank sheet 71 to form a tailored blank sheet 83 (see FIG. 17(b)).

Figure 18:
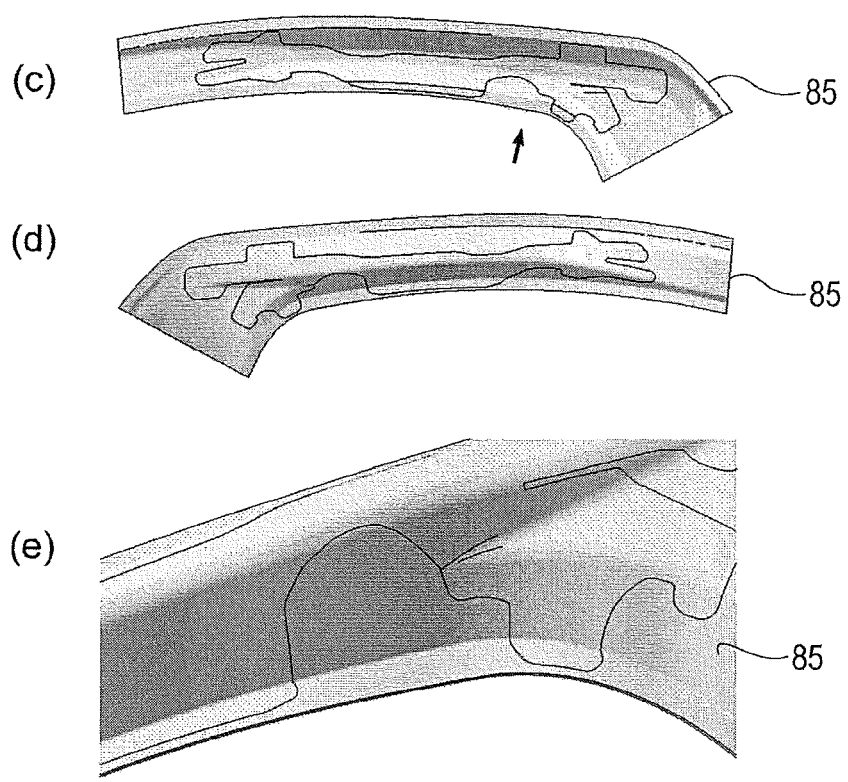
FIG. 18 is a diagram illustrating an example of a method for improving the rigidity on the basis of the result obtained after performing the rigidity-contributable-portion detecting step illustrated in FIG. 13 (part 5).
Figure 19:
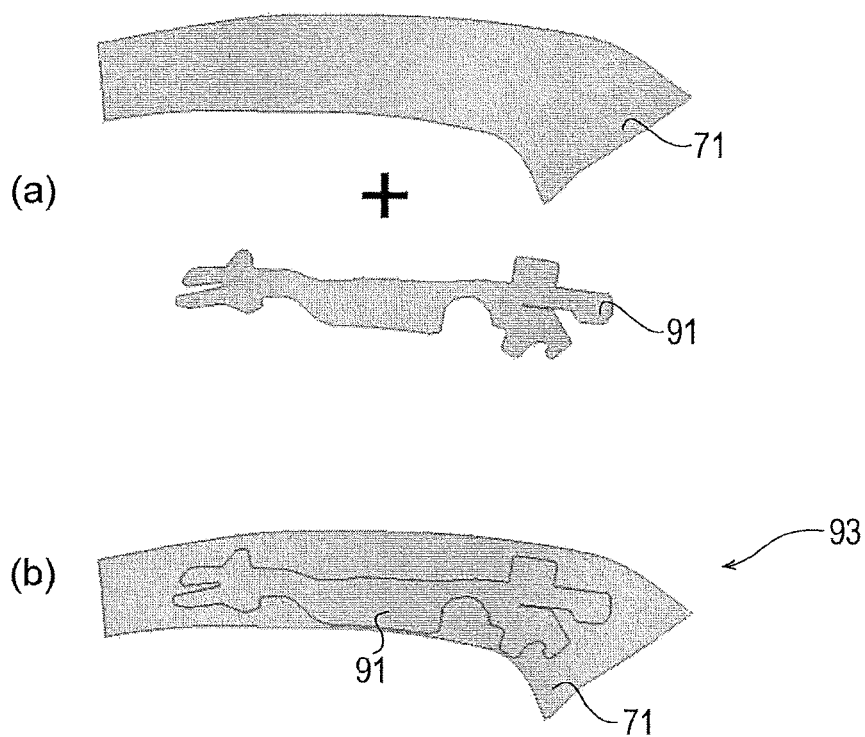
FIG. 19 is a diagram illustrating an example of a method for improving the rigidity on the basis of the result obtained after performing the rigidity-contributable-portion detecting step illustrated in FIG. 13 (part 6).

FIG. 18 illustrates a press-formed part 85 formed by press forming the tailored blank sheet 83 thus formed. FIG. 18(c) is a plan view of the press-formed part 85, FIG. 18(d) is a bottom view of the press-formed part 85, and FIG. 18(e) is a perspective view of the press-formed part 85 viewed in a direction of an arrow illustrated in FIG. 18(c). As illustrated in FIG. 18(e), the press-formed part 85 does not have a stepped portion like the one seen in FIG. 16(e) because the blank sheet 71 and the sheet member 81 have the same thickness.

In the case of bonding another sheet, as illustrated in FIG. 19(a), a sheet member 91 having the same shape as the rigidity contributable portion 71a of the blank sheet 71, the same thickness as the blank sheet 71, and the same Young's modulus as the blank sheet 71 is bonded to the rigidity contributable portion 71a to form a reinforced blank sheet 93 (see FIG. 19(b)).

Figure 20:
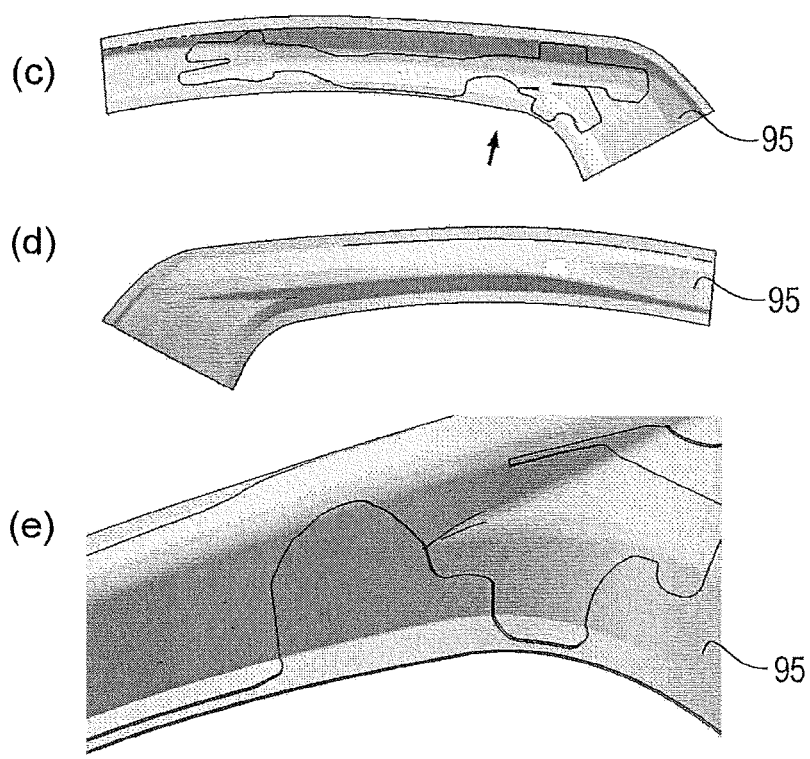
FIG. 20 is a diagram illustrating an example of a method for improving the rigidity on the basis of the result obtained after performing the rigidity-contributable-portion detecting step illustrated in FIG. 13 (part 7).
Figure 21:
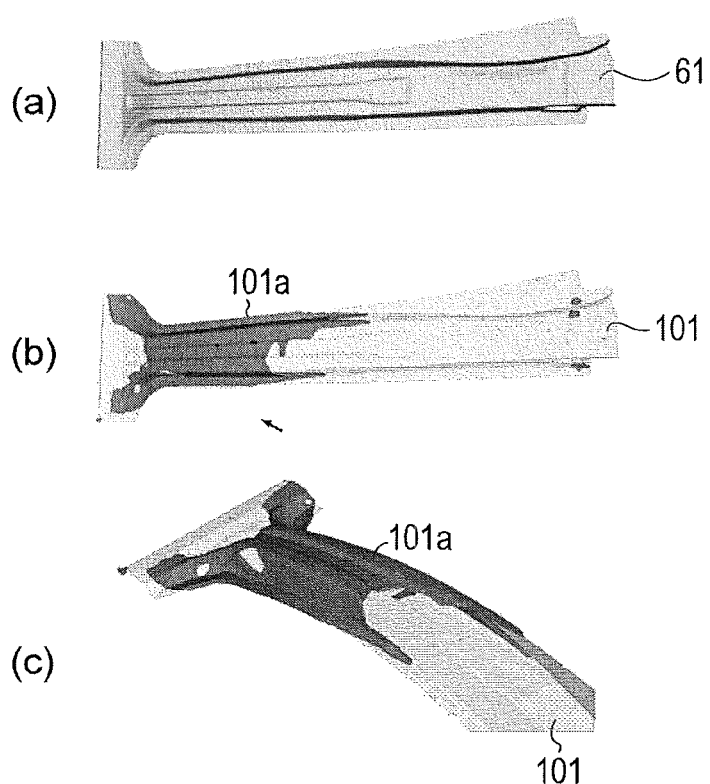
FIG. 21 is a diagram illustrating a B pillar and a result for the B pillar obtained after performing a rigidity-contributable-portion detecting step in the method for manufacturing a springback-reduced part according to the second embodiment of the present invention.
Figure 22:
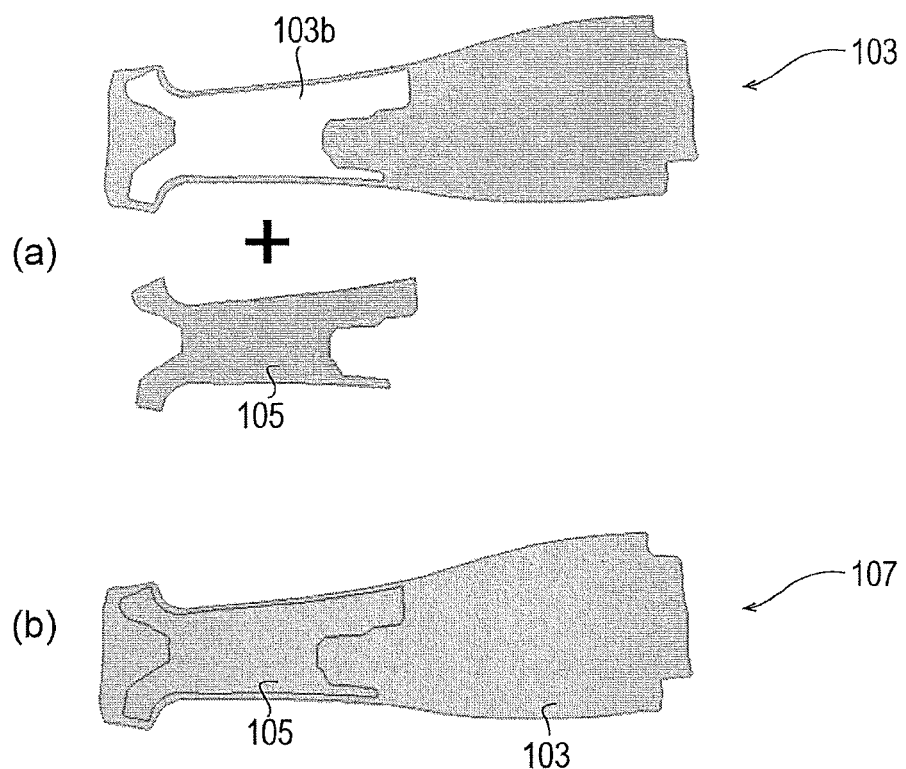
FIG. 22 is a diagram illustrating an example of a method for improving the rigidity on the basis of the result obtained after performing the rigidity-contributable-portion detecting step illustrated in FIG. 21 (part 1).

FIG. 20 illustrates a press-formed part 95 formed by press forming the reinforced blank sheet 93 thus formed. FIG. 20(c) is a plan view of the press-formed part 95, FIG. 20(d) is a bottom view of the press-formed part 95, and FIG. 20(e) is a perspective view of the press-formed part 95 viewed in a direction of an arrow illustrated in FIG. 20(c). As illustrated in FIG. 20(e), the press-formed part 95 has a stepped portion due to the sheet member 91 bonded to the blank sheet 71.

Next, as in the case of the A pillar 21, an analytic model 101 of the B pillar 61 and an analytic model 131 of the shock tower RF 63 are formed with plane elements and solid elements and subjected to an optimization analysis for shape to detect rigidity contributable portions. The following describes examples where the rigidity of the rigidity contributable portions thus detected is improved.

Firstly, the B pillar 61 is described referring to FIG. 21 to FIG. 27. FIG. 21(b) and FIG. 21(c) illustrate a result of an optimization analysis for shape performed on the analytic model 101 of the B pillar 61 illustrated in FIG. 21(a). FIG. 21(b) is a plan view of the analytic model 101 after the rigidity-contributable-portion detecting step S5 and FIG. 21(c) is a perspective view of the analytic model 101 viewed in a direction of an arrow illustrated in FIG. 21(b) after the rigidity-contributable-portion detecting step S5. The rigidity contributable portion 101a is marked with thick grey.

Then, the analytic model 101 thus obtained is subjected to an analysis of reverse press forming and opened into the flat shape back to a shape of a blank sheet 103. Here, the thickness of the blank sheet 103 is 2.0 mm.

The following describes examples where the rigidity of rigidity contributable portion of the blank sheet 103 thus detected is increased by above-described methods of increasing the sheet thickness, by increasing the Young's modulus, and by bonding another sheet.

As in the case of the A pillar 21, in the case of increasing the thickness, the rigidity contributable portion of the blank sheet 103 is blanked to form a blanked hole 103b. A sheet member 105 having the same shape as the rigidity contributable portion and a thickness of two times as thick as the thickness of the blank sheet 103 (2.0 mm×2=4.0 mm) is fitted into the blanked hole 103b (see FIG. 22(a)) and welded to the blank sheet 103 to form a tailored blank sheet 107 (see FIG. 22(b)).

Figure 23:
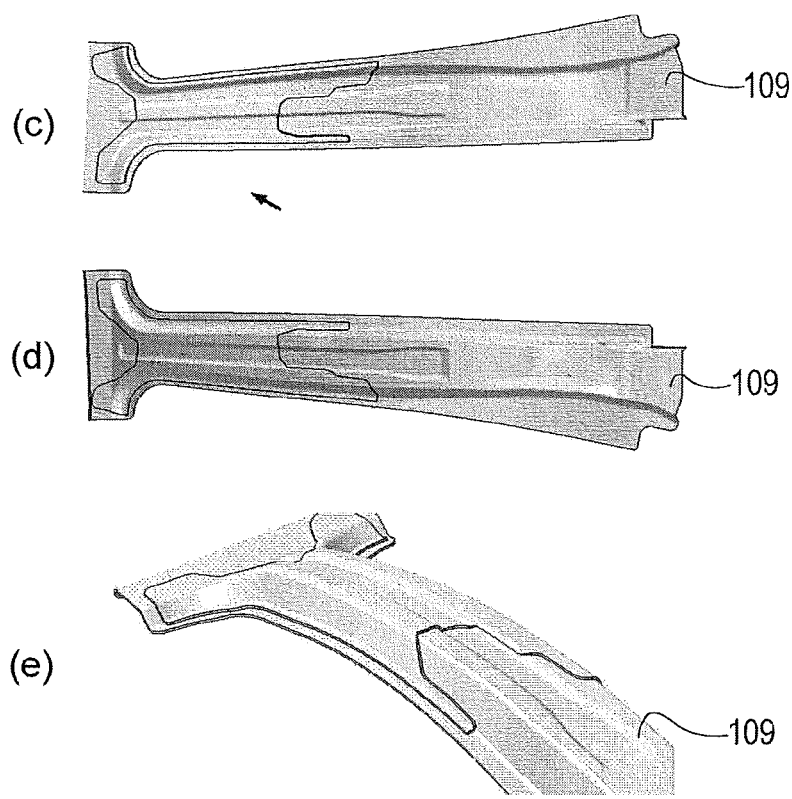
FIG. 23 is a diagram illustrating an example of a method for improving the rigidity on the basis of the result obtained after performing the rigidity-contributable-portion detecting step illustrated in FIG. 21 (part 2).
Figure 24:
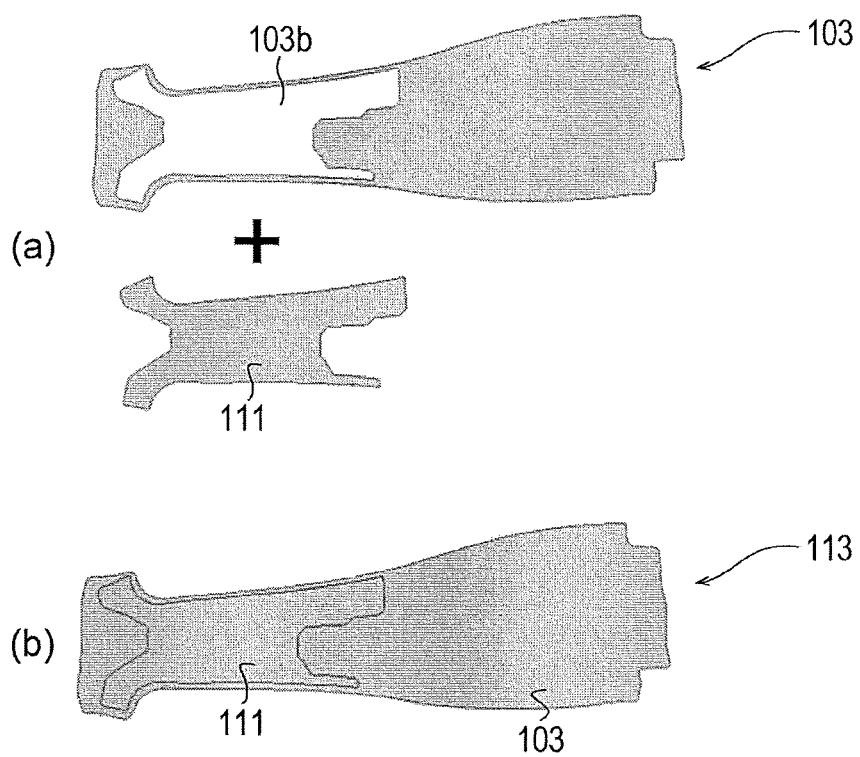
FIG. 24 is a diagram illustrating an example of a method for improving the rigidity on the basis of the result obtained after performing the rigidity-contributable-portion detecting step illustrated in FIG. 21 (part 3).

FIG. 23 illustrates a press-formed part 109 formed by press forming the tailored blank sheet 107 thus formed. FIG. 23(c) is a plan view of the press-formed part 109, FIG. 23(d) is a bottom view of the press-formed part 109, and FIG. 23(e) is a perspective view of the press-formed part 109 viewed in a direction of an arrow illustrated in FIG. 23(c).

In the case of increasing the Young's modulus, as illustrated in FIG. 24(a), a sheet member 111 which has the same shape as the rigidity contributable portion, the same thickness as the blank sheet 103, and a higher Young's modulus, is fitted into the blanked hole 103b of the blank sheet 103 and welded to the blank sheet 103 to form a tailored blank sheet 113 (see FIG. 24(b)).

Figure 25:
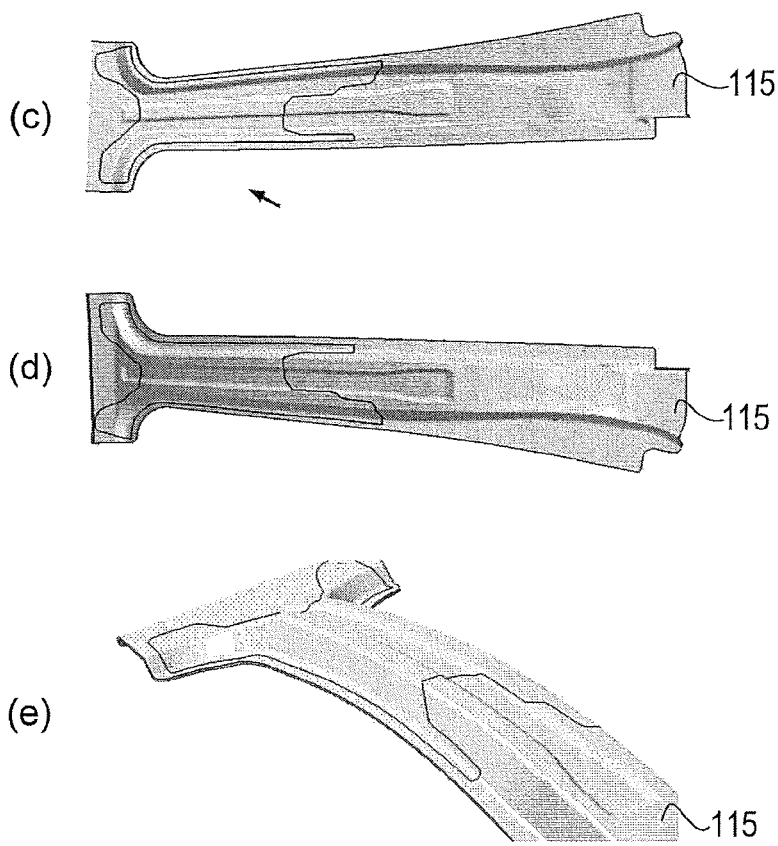
FIG. 25 is a diagram illustrating an example of a method for improving the rigidity on the basis of the result obtained after performing the rigidity-contributable-portion detecting step illustrated in FIG. 21 (part 4).
Figure 26:
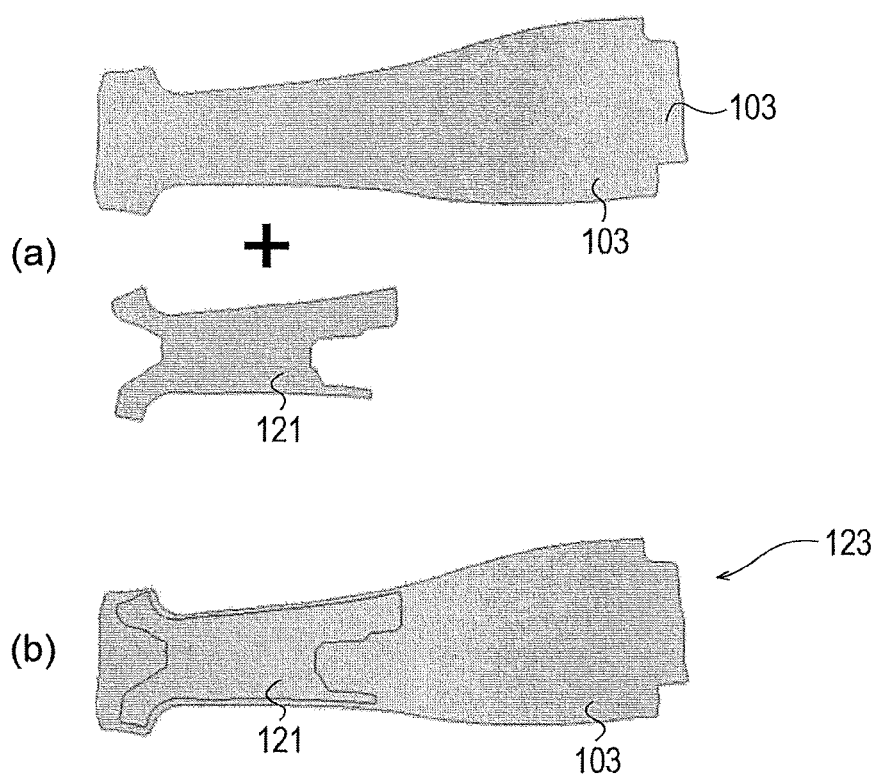
FIG. 26 is a diagram illustrating an example of a method for improving the rigidity on the basis of the result obtained after performing the rigidity-contributable-portion detecting step illustrated in FIG. 21 (part 5).

FIG. 25 illustrates a press-formed part 115 formed by press forming the tailored blank sheet 113 thus formed. FIG. 25(c) is a plan view of the press-formed part 115, FIG. 25(d) is a bottom view of the press-formed part 115, and FIG. 25(e) is a perspective view of the press-formed part 115 viewed in a direction of an arrow illustrated in FIG. 25(c).

In the case of bonding another sheet, as illustrated in FIG. 26(a), a sheet member 121 having the same shape as the rigidity contributable portion of the blank sheet 103, the same thickness as the blank sheet 103, and the same Young's modulus as the blank sheet 103 is bonded to the rigidity contributable portion to form a reinforced blank sheet 123 (see FIG. 26(b)).

Figure 27:
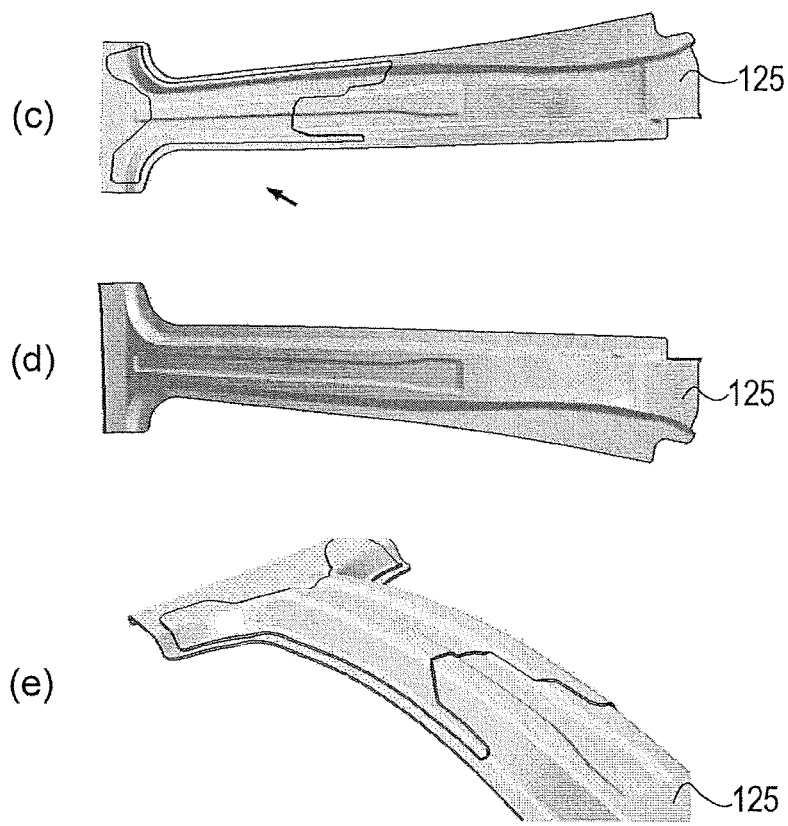
FIG. 27 is a diagram illustrating an example of a method for improving the rigidity on the basis of the result obtained after performing the rigidity-contributable-portion detecting step illustrated in FIG. 21 (part 6).
Figure 28:
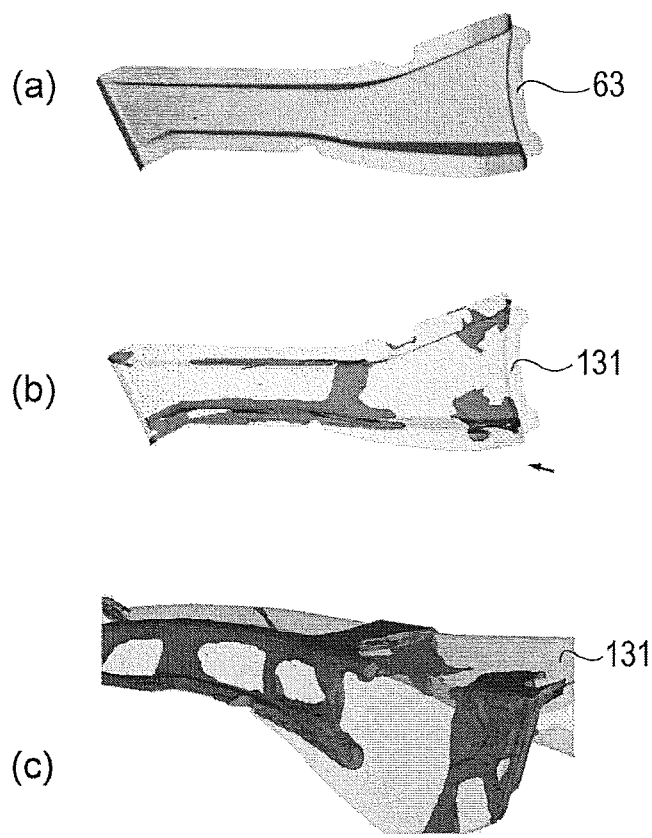
FIG. 28 is a diagram illustrating a shock tower reinforcement (RF) and a result for the shock tower RF obtained after performing a rigidity-contributable-portion detecting step in the method for manufacturing a springback-reduced part according to the second embodiment of the present invention.
Figure 29:
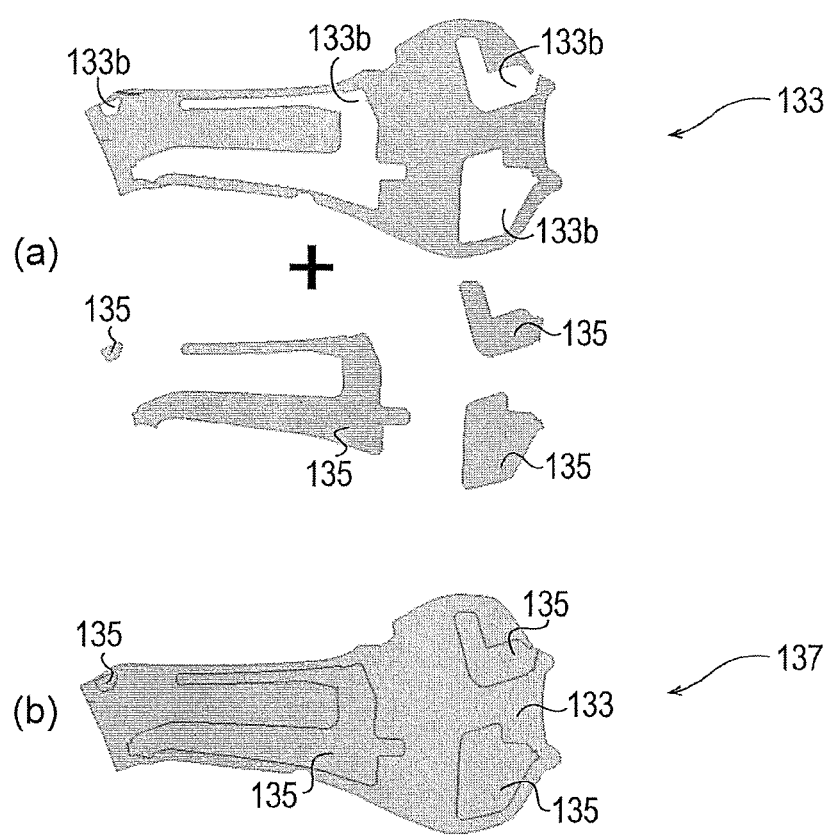
FIG. 29 is a diagram illustrating an example of a method for improving the rigidity on the basis of the result obtained after performing the rigidity-contributable-portion detecting step illustrated in FIG. 28 (part 1).

FIG. 27 illustrates a press-formed part 125 formed by press forming the reinforced blank sheet 123 thus formed. FIG. 27(c) is a plan view of the press-formed part 125, FIG. 27(d) is a bottom view of the press-formed part 125, and FIG. 27(e) is a perspective view of the press-formed part 125 viewed in a direction of an arrow illustrated in FIG. 27(c).

Secondly, the shock tower RF 63 is described referring to FIG. 28 to FIG. 34. FIG. 28(b) and FIG. 28(c) illustrate a result of an optimization analysis for shape performed on the analytic model 131 of the shock tower RF 63 illustrated in FIG. 28(a). FIG. 28(b) is a plan view of the analytic model 131 after the rigidity-contributable-portion detecting step S5 and FIG. 28(c) is a perspective view of the analytic model 131 after the rigidity-contributable-portion detecting step S5 viewed in a direction of an arrow illustrated in FIG. 28(b). Rigidity contributable portions are marked with thick grey. As illustrated in FIG. 28(b) and FIG. 28(c), a multiple of rigidity contributable portions are left at a multiple of positions. As in this case, the present invention is also applicable to the case where a multiple of rigidity contributable portions is dispersed at a multiple of positions.

Then, the analytic model 131 thus obtained is subjected to an analysis of reverse press forming and opened into a flat shape back to a shape of the blank sheet 133. Here, the thickness of the blank sheet 133 is 0.7 mm.

The following describes examples where the rigidity of the rigidity contributable portion of the blank sheet 133 thus detected is improved by increasing the thickness of the rigidity contributable portions, by increasing the Young's modulus of the rigidity contributable portions, and by bonding another sheet to the rigidity contributable portions, as in the cases of the A pillar 21 and the B pillar 61.

In the case of increasing the thickness, the rigidity contributable portions of the blank sheet 133 are blanked to form blanked holes 103b. Sheet members 135 having the same shapes as the rigidity contributable portions and a thickness of two times as thick as the thickness of the blank sheet 133 (0.7 mm×2=1.4 mm) are fitted into the blanked holes 133b (see FIG. 29(a)) and welded to the blank sheet 133 to form a tailored blank sheet 137 (see FIG. 29(b)).

Here, the rigidity contributable portions may have shapes other than an enclosed shape. In the case where a rigidity contributable portion has a shape other than an enclosed shape, for example, as in the case of an upper left blanked hole 133b of the blank sheet 133 in FIG. 29(a), the blank sheet 133 may be blanked (cut out) such that the hole 133b of the blank sheet 133 makes an outline of the blank sheet 133 partially discontinuous. As described above, the present invention is applicable to the case where the rigidity contributable portions have shapes other than an enclosed shape.

Figure 30:
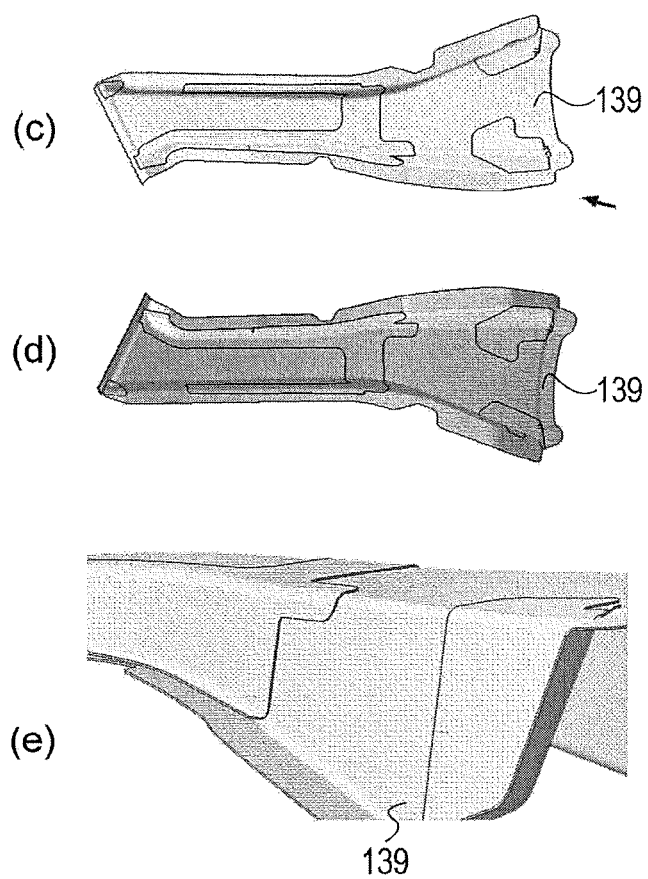
FIG. 30 is a diagram illustrating an example of a method for improving the rigidity on the basis of the result obtained after performing the rigidity-contributable-portion detecting step illustrated in FIG. 28 (part 2).
Figure 31:
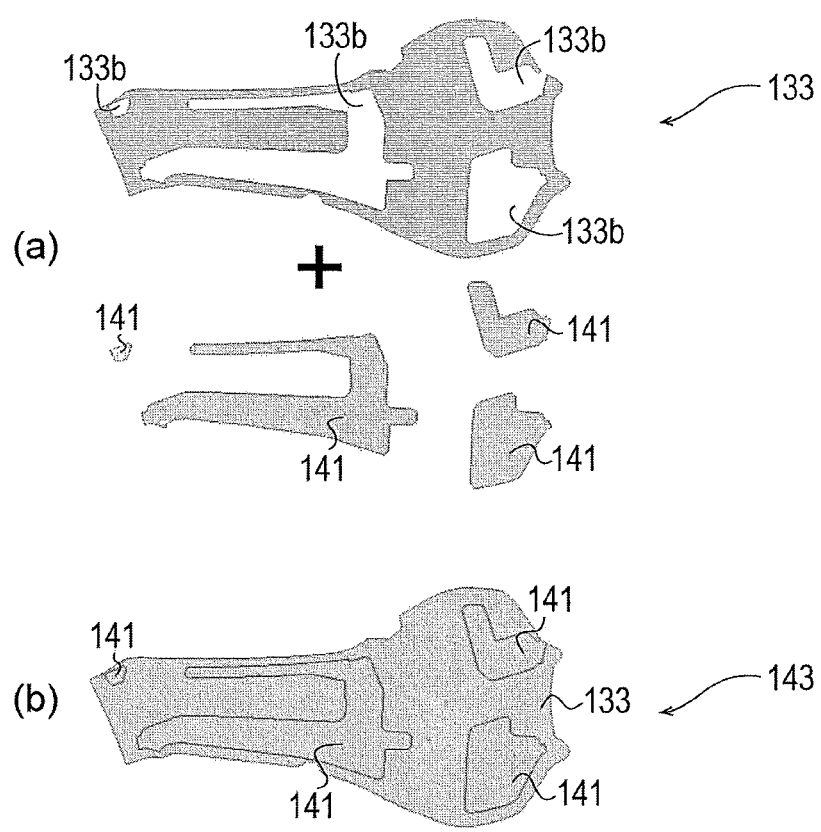
FIG. 31 is a diagram illustrating an example of a method for improving the rigidity on the basis of the result obtained after performing the rigidity-contributable-portion detecting step illustrated in FIG. 28 (part 3).

FIG. 30 illustrates a press-formed part 139 formed by press, forming the tailored blank sheet 137 thus formed. FIG. 30(c) is a plan view of the press-formed part 139, FIG. 30(d) is a bottom view of the press-formed part 139, and FIG. 30(e) is a perspective view of the press-formed part 139 viewed in a direction of an arrow illustrated in FIG. 30(c).

In the case of increasing the Young's modulus, as illustrated in FIG. 31(a), sheet members 141, which have the same shapes as the rigidity contributable portions, the same thickness as the blank sheet 133, and a higher Young's modulus, are fitted into the blanked holes 133b of the blank sheet 133 and welded to the blank sheet 133 to form a tailored blank sheet 143 (see FIG. 31(b)).

Figure 32:
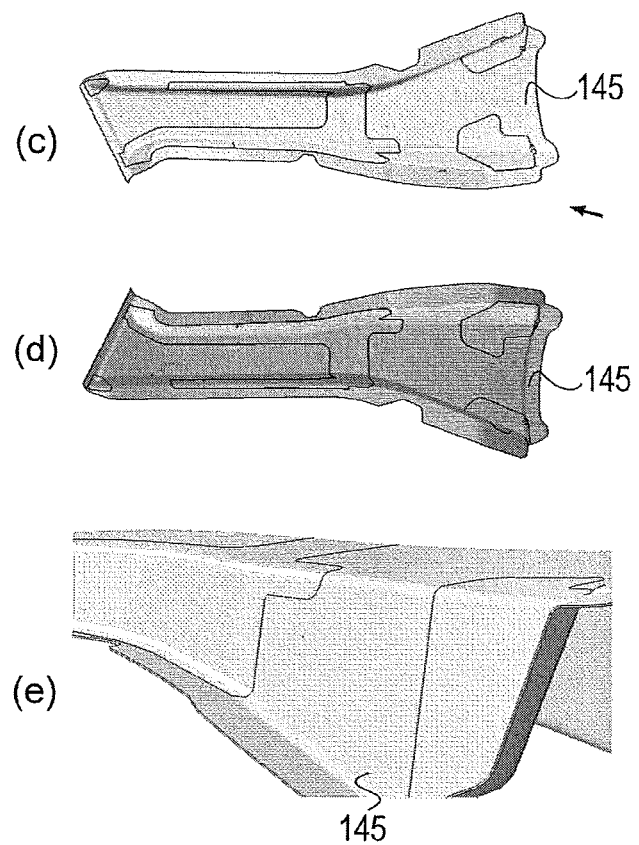
FIG. 32 is a diagram illustrating an example of a method for improving the rigidity on the basis of the result obtained after performing the rigidity-contributable-portion detecting step illustrated in FIG. 28 (part 4).
Figure 33:
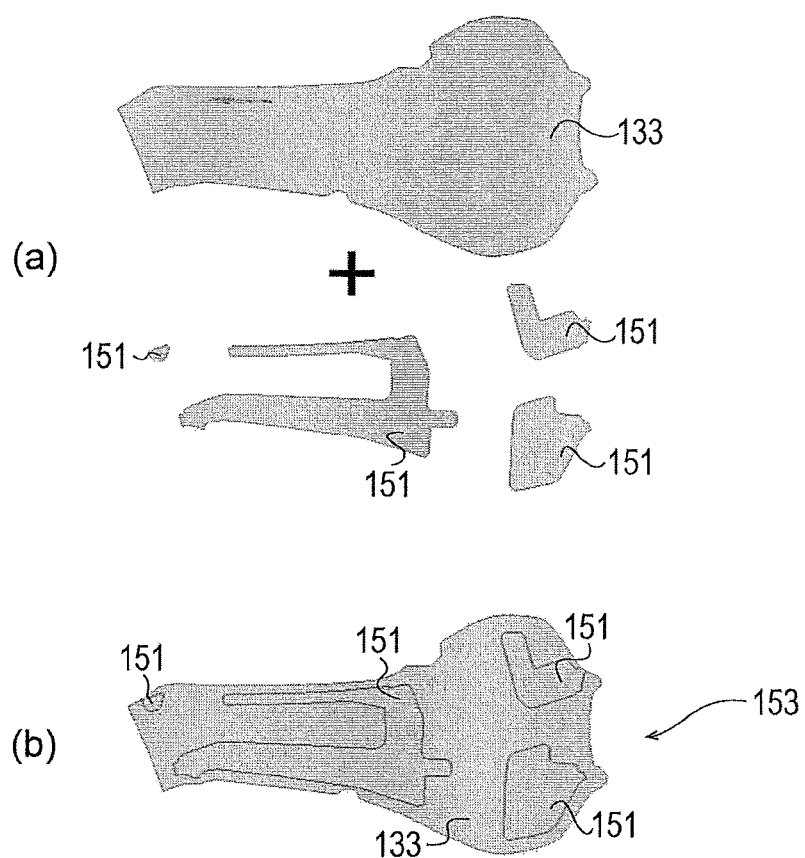
FIG. 33 is a diagram illustrating an example of a method for improving the rigidity on the basis of the result obtained after performing the rigidity-contributable-portion detecting step illustrated in FIG. 28 (part 5).

FIG. 32 illustrates a press-formed part 145 formed by press forming the tailored blank sheet 143 thus formed. FIG. 32(c) is a plan view of the press-formed part 145, FIG. 32(d) is a bottom view of the press-formed part 145, and FIG. 32(e) is a perspective view of the press-formed part 145 viewed in a direction of an arrow illustrated in FIG. 32(c).

In the case of bonding another sheet, as illustrated in FIG. 33(a), sheet members 151, which have the same shape as the rigidity contributable portions of the blank sheet 133, the same thickness as the blank sheet 133, and the same Young's modulus as the blank sheet 133, are bonded to the rigidity contributable portions to form a reinforced blank sheet 153 (see FIG. 33(b)).

Figure 34:
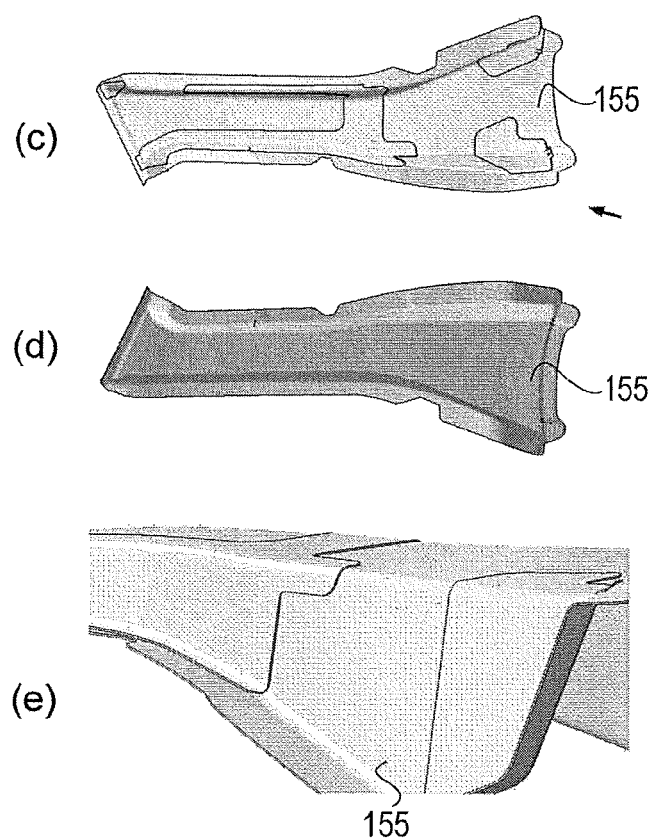
FIG. 34 is a diagram illustrating an example of a method for improving the rigidity on the basis of the result obtained after performing the rigidity-contributable-portion detecting step illustrated in FIG. 28 (part 6).

FIG. 34 illustrates a press-formed part 155 formed by press forming the reinforced blank sheet 153 thus formed. FIG. 34(c) is a plan view of the press-formed part 155, FIG. 34(d) is a bottom view of the press-formed part 155, and Fi 34(e) is a perspective view of the press-formed part 155 viewed in a direction of an arrow illustrated in FIG. 34(c).

As described above, the rigidity of the rigidity contributable portion of the springback-reduced parts according to the second embodiment of the present invention (the press-formed part 77 of FIG. 16, the press-formed part 85 of FIG. 18, the press-formed part 95 of FIG. 20, the press-formed part 109 of FIG. 23, the press-formed part 115 of FIG. 25, the press-formed part 125 of FIG. 27, the press-formed part 139 of FIG. 30, the press-formed part 145 of FIG. 32, and the press-formed part 155 of FIG. 34) can be improved by fitting a member having a large thickness or a higher Young's modulus into the rigidity contributable portion, which is the specific portion of a blank sheet, or by bonding another sheet to the portion. Thus, a springback can be reduced in a formed part.

In addition, assembling the springback-reduced part thus manufactured into a vehicle body, which is an exemplary structure to be constructed with the springback-reduced part, can improve the rigidity of the vehicle body.

Example 1

Computer simulation experiments were conducted to confirm the springback reduction effect of the springback-reduced part according to the present invention. Results of the experiments are described now.

Figure 35:
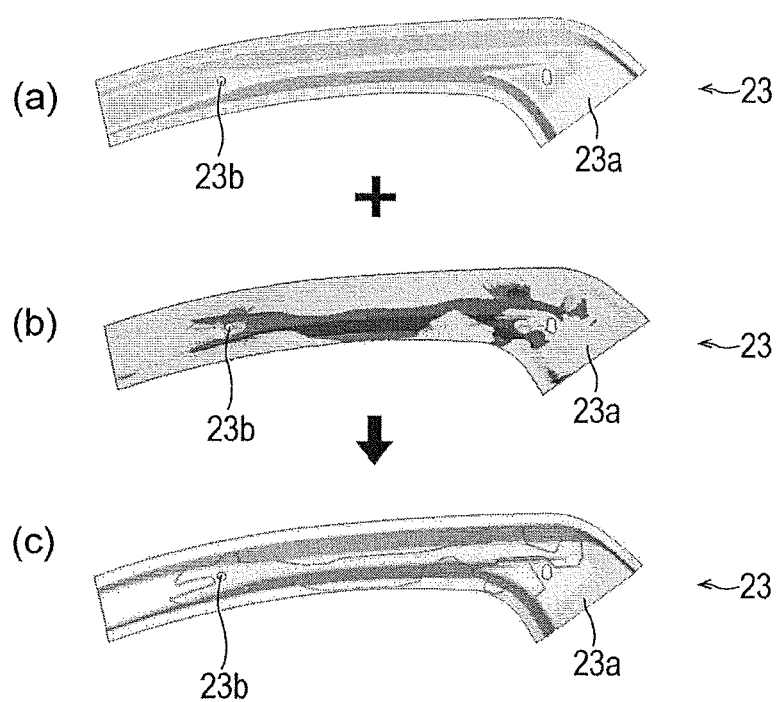
FIG. 35 is a diagram illustrating the rigidity improving step in the method for reducing springback according to Example 1 of the present invention.

Firstly, contents of the experiment will be described. In this example, the A pillar 21 used in the first embodiment and the second embodiment is analyzed. As illustrated in FIG. 35, a rigidity improvement method was performed on the initial shape of the A pillar 21 (see FIG. 35(*a*)) on the basis of the rigidity contributable portion (see FIG. 35(*b*), which is the same as the one illustrated in FIG. 9(*c*)), detected in the rigidity-contributable-portion detecting step S5.

It is assumed that a springback-reduced part is manufactured by using a tailored blank sheet formed such that the thickness of the rigidity contributable portion is two times as large as the blank sheet as an example of the rigidity improvement method as described in the second embodiment. Thus, as illustrated in FIG. 35(*c*), an analytic model 23 (Invention Example 1) of an A pillar 21 having a rigidity contributable portion whose thickness is two times as large as the other portion is prepared.

Subsequently, in the computer simulation, a bending-torsional-combined load is applied to an analytic model 23 (Invention Example 1) illustrated in FIG. 35(*c*) on which the rigidity improvement method has been performed and to an analytic model 23 (Comparative Example 1) illustrated in FIG. 35(*a*) on which the rigidity improvement method has not been performed. Then, a springback analysis was performed to analyze a springback that causes a bending-torsional-combined deformation.

Table 1 shows maximum displacement differences (mm, a difference between the maximum displacement and the minimum displacement) in the Z direction as the results of analysis. Table 1 also shows the result of analysis similarly performed on Comparative Example 2, in which the thickness of a ceiling portion 23a of the analytic model 23 is doubled in accordance with a human intuition (see FIG. 36).

TABLE 1

|  | Invention Example 1 | Comparative Example 1 | Comparative Example 2 |
|---|---|---|---|
| Maximum Displacement Amount (mm) | 8.2 | 17.4 | 10.6 |

Figure 36:
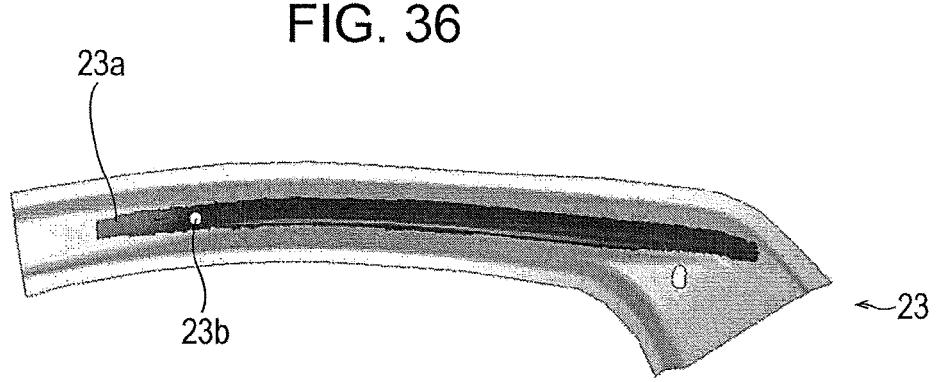
FIG. 36 is a diagram illustrating a comparative example used for confirming the effect of the rigidity improving step illustrated in FIG. 35.

As shown in Table 1, the amount of torsion calculated by the simulation is 17.4 mm in Comparative Example 1 (before performing the rigidity improvement method, see FIG. 35(*a*)), 8.2 mm in Invention Example 1 (after performing the rigidity improvement method, see FIG. 35(*c*)), and 10.6 mm in Comparative Example 2 (see FIG. 36). The amount of torsion is reduced in both Invention Example 1 and Comparative Example 2 on which improvements have been performed, but the amount of torsion is reduced to a larger degree in Invention Example 1.

When a flexural rigidity analyses were performed on Comparative Example 1 and on Invention Example 1, the flexural rigidity of Invention Example 1 was improved by 17.3% with respect to Comparative Example 1. Similarly, when a torsional rigidity analyses were performed on Comparative Example 1 and on Invention Example 1, the torsional rigidity of Invention Example 1 was improved by 7.8% with respect to Comparative Example 1. These results show that the rigidity of the A pillar 21 is improved. Consequently, assembling the A pillar 21 into the vehicle body can improve the rigidity of the vehicle body.

Description provided above has proved that the present example can detect the rigidity contributable portion of an analytic model 23 of the A pillar 21, improve the rigidity of the A pillar 21 on the basis of the detected rigidity contributable portion, and thus reduce the springback. Moreover, the improvement of the rigidity of the A pillar 21 provides an additional effect of improving the rigidity of the vehicle body.

Example 2

Experiments, which are different from the ones conducted in Example 1, were conducted to confirm the springback reduction effect in the springback-reduced part according to the present invention. The results of experiments will be described now.

Example 1 showed an example where the thickness of a portion in the analysis model 23 of the A pillar 21 is increased on the basis of the rigidity contributable portion detected in the rigidity-contributable-portion detecting step S5 as an example of the rigidity improvement method. In this example, on the other hand, an example where the rigidity is improved by shaping a portion of the analytic model 23 of the A pillar 21 into a recessed shape on the basis of the rigidity contributable portion will be described.

Figure 37:
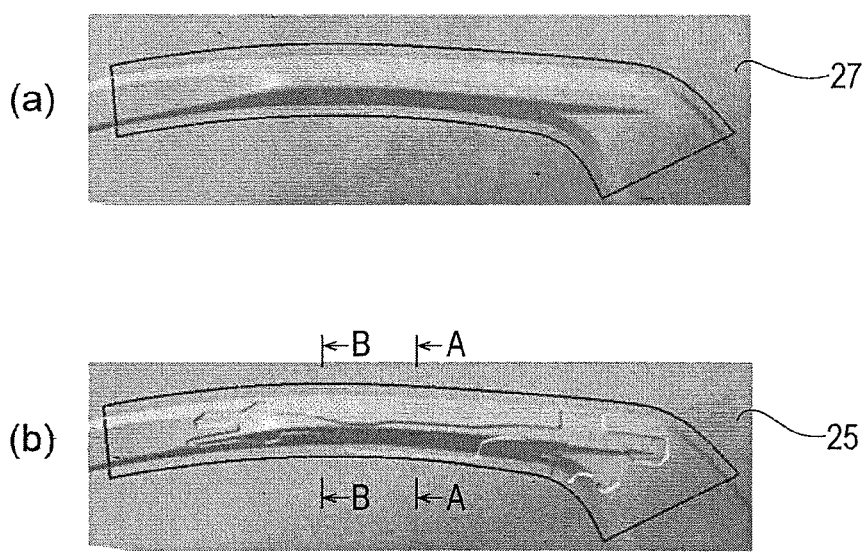
FIG. 37 is a diagram illustrating the springback reduction method according to Example 2 of the present invention.

A shape that roughly follows the outline shape of the rigidity contributable portion was used as a recessed shape. FIG. 37(*b*) illustrates a lower die 25 (after performing the improvement) with which a portion is formed into a recessed shape while FIG. 37(*a*) illustrates a lower die 27 (before performing the improvement) with which a portion is not formed into a recessed shape for comparison.

Usually, the rigidity can be improved more efficiently by shaping a part into a protruding shape than into a recessed shape because the part having a protruding shape has a higher height. However, depending on a shape of the part, a portion of the part may have an angle of depression if the portion is to be shaped in a protruding shape. Such a part cannot be formed by a press forming. If a protruding portion is formed in the A pillar 21, the portion has an angle of depression. For this reason, a die for shaping a part into a recessed shape is adopted in the example.

Figure 38:
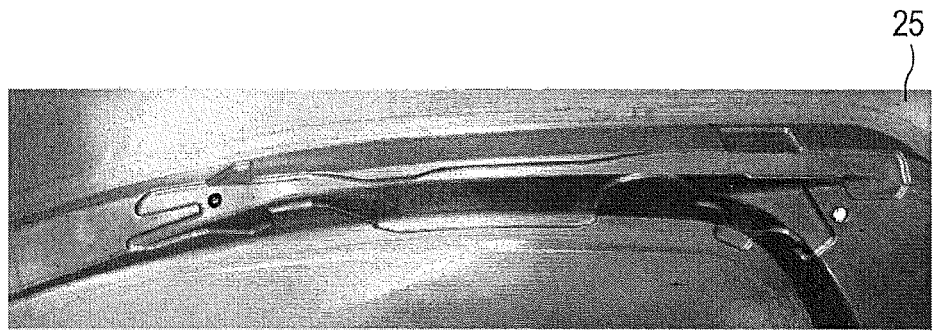
FIG. 38 illustrates a die fabricated for confirming the effect of the springback reduction method illustrated in FIG. 37.
Figure 39:
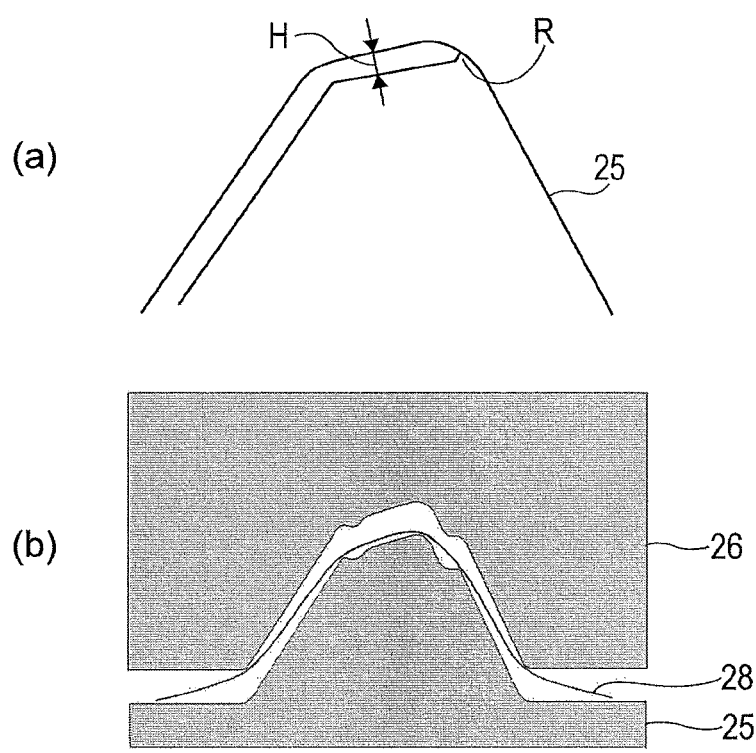
FIG. 39 is a diagram illustrating the die illustrated in FIG. 38 and including cross sections taken along the lines A-A and B-B of FIG. 37.

In Example 2, a press-formed part 29 (FIG. 40) was formed by a press forming using an actually fabricated lower die 25 illustrated in FIG. 37(*b*) (and FIG. 38) for forming the A pillar 21 by a press forming and an upper die 26 corresponding to the lower die 25. The depth H of the recess of the lower die 25 and the shape of the edge R of the recess were determined such that the springback reduction effect becomes the maximum within a range that cracks do not occur. Specifically, the depth H of the recess was uniformly set to 4 mm and the shape of the edge of the recess was set such that a radius R=3 mm (see FIG. 39(a)). FIG. 39(b) illustrates the lower die 25, the blank sheet 28, and the upper die 26 during the press forming in a cross section taken along the line B-B in FIG. 37.

Figure 40:
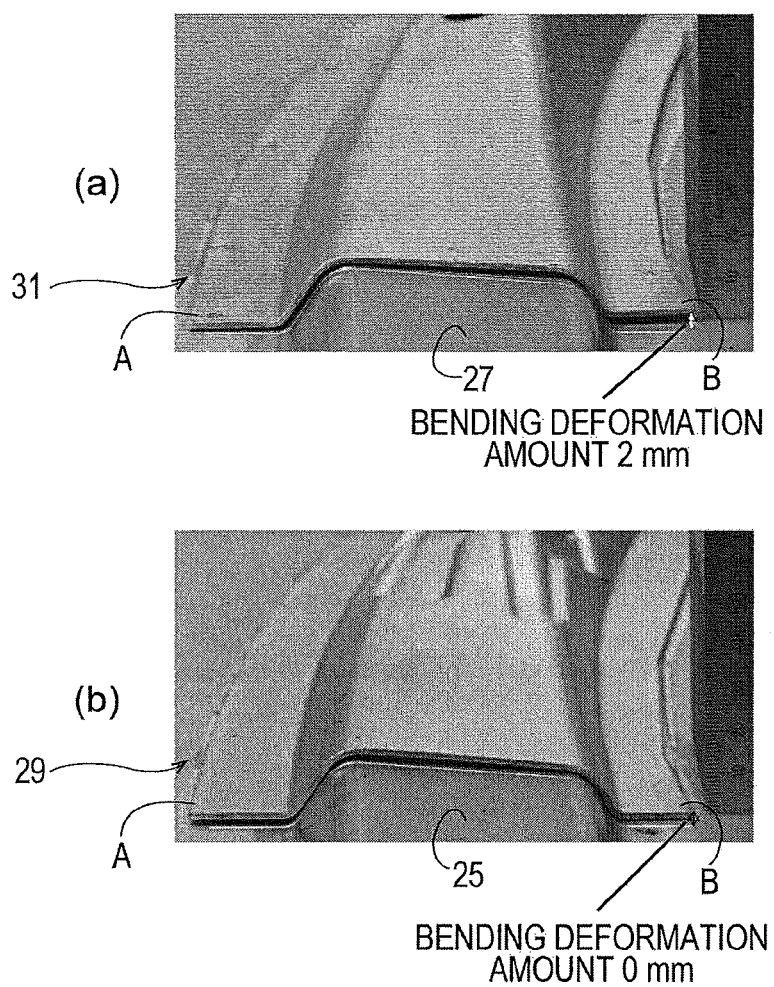
FIG. 40 is a diagram illustrating results obtained after performing the springback reduction method as illustrated in FIG. 37 (part 1).
Figure 41:
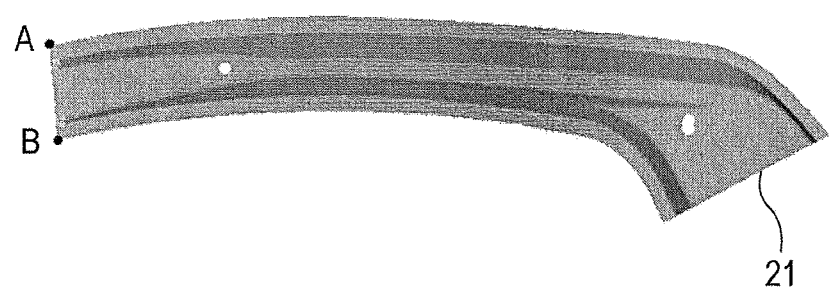
FIG. 41 is a diagram illustrating a method for evaluating the result obtained after performing the springback reduction method as illustrated in FIG. 37.

FIG. 40 illustrates the results obtained after an actual press forming. A steel sheet having strength of 440 MPa and a thickness of 1.4 mm was used as a base material. FIG. 40 illustrates the state where a press-formed part overlaps the lower die 25 to show the resultant springback. Specifically, FIG. 40 illustrates the state where an end portion of the A pillar 21 illustrated on the left of FIG. 3(a) is viewed from the left of the A pillar 21. FIG. 40(a) illustrates a press-formed part 31 (Comparative Example 3) formed by a press forming using a lower die 27 without the measure against the springback, and an upper die, not illustrated, corresponding to the lower die 27 for comparison. FIG. 40(b) illustrates a press-formed part 29 (Invention Example 2) formed using the lower die 25 with the measure against the springback, and the upper die 26. As illustrated in FIG. 41, an upper corner of the end portion is provisionally taken as a corner A and a lower corner of the end portion is provisionally taken as a corner B. In the press-formed part 31 (Comparative Example 3) formed using the lower die 27 without the measure against the springback, and the upper die corresponding to the lower die 27, the corner B was 2 mm apart from the lower die 27 as indicated by the arrow in FIG. 40(a) (bending deformation amount was 2 mm). On the other hand, in the press-formed part 29 (Invention Example 2), the corner B was in contact with the lower die 25 as illustrated in FIG. 40(b) and the bending deformation did not occur in the corner B.

Figure 42:
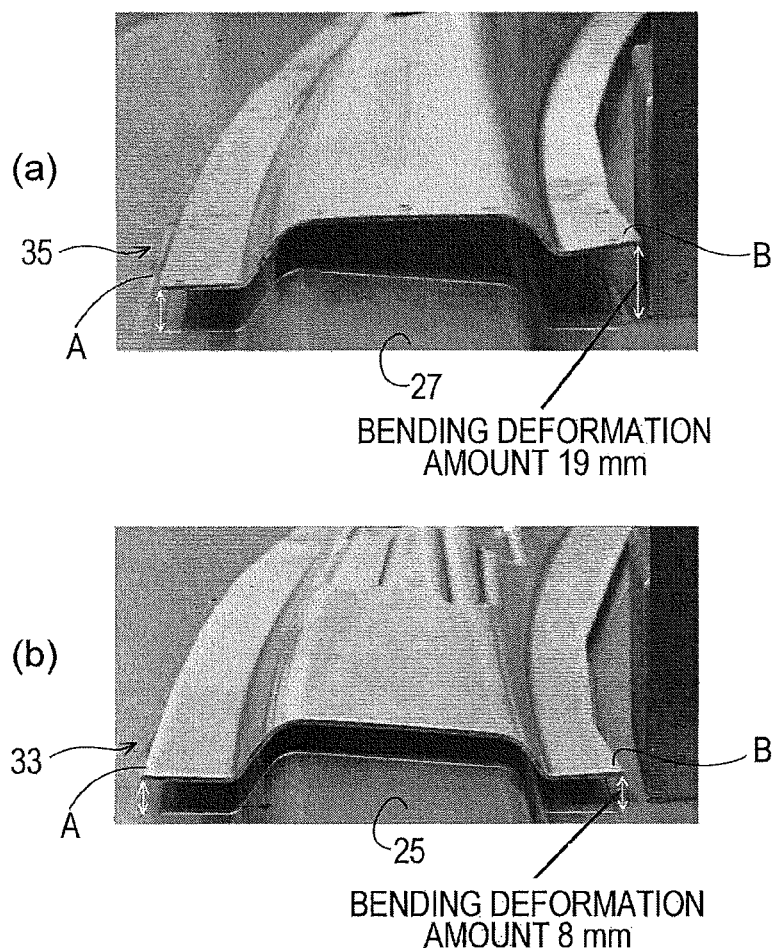
FIG. 42 is a diagram illustrating results obtained after performing the springback reduction method illustrated in FIG. 37 (part 2).

FIG. 42 illustrates the results obtained after actually performing press forming on a base material, which is a high strength steel sheet having a strength of 980 MPa (thickness 1.4 mm), using two types of dies (a pair of the lower die 25 and the upper die 26 and a pair of the lower die 27 and an upper die corresponding to the lower die 27). FIG. 42(a) illustrates a press-formed part 35 (Comparative Example 4) formed using the lower die 27 and an upper die corresponding to the lower die 27. FIG. 42(b) illustrates a press-formed part 33 (Invention Example 3) formed using the lower die 25 and the upper die 26. As in the case of FIG. 40, FIG. 42 illustrates the state where the press-formed part (the press-formed part 33 or the press-formed part 35) overlaps the lower die (the lower die 25 or the lower die 27) viewed from the point similar to that in the case of FIG. 40.

As illustrated in FIG. 42(a), in the press-formed part 35 (Comparative Example 4), both the corner A and the corner B undergo bending deformation and thus are apart from the lower die 27 to a large degree. The corner B, in particular, has an amount of bending deformation of 19 mm. In addition, as indicated by the arrows in FIG. 42(a), the amount of bending deformation in the corner A and the amount of bending deformation in the corner B are not uniform with each other. This fact shows that the torsional deformation has also occurred. On the other hand, in the press-formed part 33 (Invention Example 3), the corner B is apart from the lower die 25 as illustrated in FIG. 42(b), but the amount by which it is apart (bending deformation amount) is 8 mm, which is small. This result shows that the bending deformation is reduced to a larger degree compared with the case of Comparative Example 4. In addition, as indicated by the arrows illustrated in FIG. 42(b), the amount of bending deformation in the corner A and the amount of bending deformation in the corner B are substantially the same. This fact shows that the torsional deformation did not occur.

A computer aided engineering (CAE) analysis of springback was performed on Comparative Example 4 and Invention Example 3. Table 2 collectively lists the results of amounts of bending deformation and amounts of torsional deformation at the corners A and the corners B of Comparative Example 4 and Invention Example 3 from the die (the lower die 25 and the lower die 27). The amount of torsional deformation represents how much the corner B is bent with reference to the corner A and is calculated by subtracting the amount of bending deformation at the corner A from the amount of bending deformation at the corner B. If the amount of torsional deformation is close to zero, it means that the torsional deformation is small.

TABLE 2

|  | Bending Deformation Amount at Corner A (mm) | Bending Deformation Amount at Corner B (mm) | Torsional Deformation Amount (mm) |
| --- | --- | --- | --- |
| Comparative Example 4 | 1.2 | 11.7 | 10.5 |
| Inventive Example 3 | 4.0 | 4.0 | 0.0 |

As illustrated in Table 2, the results of CAE analysis also show that the bending deformation at the corner B in Invention Example 3 is improved compared to that of Comparative Example 4. In addition, the torsional deformation did not occur in Invention Example 3. That is, the results of the CAE analysis is consistent with the experimental results described above. This means that the method for performing springback reduction according to the present invention ensures that the CAE analysis provides correct results.

Example 3

Example 2 shows results of comparison between the case where the analytic models 23 of the A pillar 21 have a recessed shape as illustrated in FIG. 37(b) as an example of the rigidity improvement method (Invention Example 2 and Invention Example 3) and the case where the rigidity improvement method is not performed on the analytic models 23, as illustrated in FIG. 37(a) (Comparative Example 3 and Comparative Example 4).

In this example, so as to confirm that a portion detected in the rigidity-contributable-portion detecting step S5 is appropriate, results of a case where the rigidity improvement method is performed on the basis of a human intuition will be described for comparison.

The rigidity improvement method according to the invention was performed such that a recessed portion is formed in a part as in the case of Example 2 (see FIG. 37(b)) (Invention Example 4). Two types of the rigidity improvement method based on the intuition were performed such that a straight recessed portion is formed in a ceiling portion 23a of the analytic model 23 (Comparative Example 5) as illustrated in FIG. 43(a) and such that six recessed portions (Comparative Example 6), formed by dividing the recessed portion illustrated in FIG. 43(a) into six, are arranged along the longitudinal direction, as illustrated in FIG. 43(b).

Figure 44:
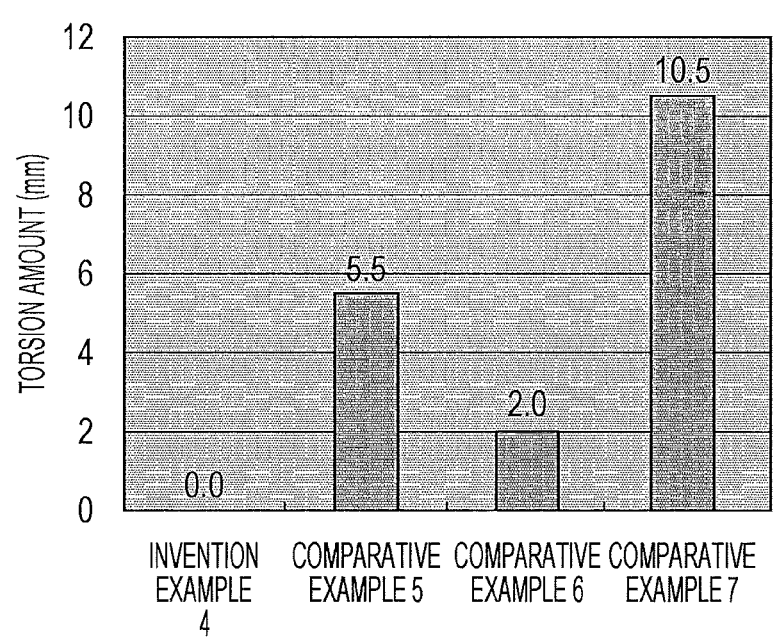
FIG. 44 is a diagram illustrating an effect of the springback reduction method according to Example 3 of the present invention.

FIG. 44 illustrates the results of CAE analysis of springback of Invention Example 4, Comparative Example 5, and Comparative Example 6. FIG. 44 is a graph of the amount of torsional deformation on the basis of the Z direction displacement at the corner A and the corner B for each of Invention Example 4, Comparative Example 5, and Comparative Example 6. FIG. 44 also shows the CAE results of Comparative Example 7 on which the rigidity improvement method is not performed for comparison.

As illustrated in FIG. 44, the amount of torsional deformation in Comparative Example 7 on which the improvement was not performed was 10.5 mm, whereas the amount of torsional deformation in Comparative Example 5 on which the improvement was performed was 5.5 mm and the amount of torsional deformation in Comparative Example 6 on which the improvement was performed was 2.0 mm. Although the amounts of torsional deformation were lower than that in Comparative Example 7, torsional deformation occurred in Comparative Examples 5 and 6. On the other hand, it is found that the torsional deformation did not occur in Invention Example 4, which resulted excellently.

As described above, it was confirmed that the method for reducing springback according to the present invention allows reduction of springback to a large degree by detecting a rigidity contributable portion of a part and by increasing the rigidity of the part on the basis of the rigidity contributable portion.

Example 4

In Example 1, Example 2, and Example 3, performing the rigidity improvement method on the A pillar 21 was studied. In Example 4, the rigidity improvement method was performed on the analytic model 101 of the B pillar 61 and the analytic model 131 of the shock tower RF 63 according to the second embodiment on the basis of the detected rigidity contributable portions (see parts (b) and (c) of FIG. 21 and parts (b) and (c) of FIG. 28). Then, experiments were conducted to check the change in rigidity in comparison with those on which the rigidity improvement method is not performed.

In the rigidity improving step S7, as the rigidity improvement method, a die that forms the rigidity contributable portion into a protruding shape was employed for the B pillar 61 and a die that forms the rigidity contributable portion into a recessed shape was employed for the shock tower RF 63.

Figure 45:
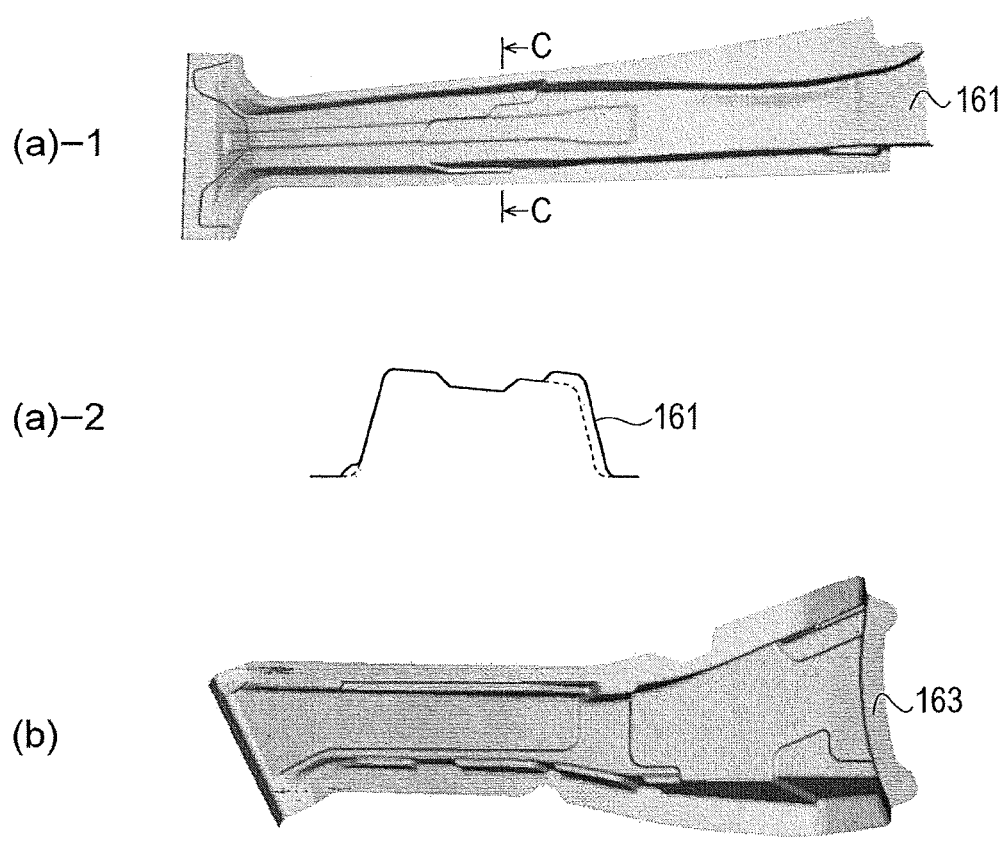
FIG. 45 is a diagram illustrating springback-reduced parts (a B pillar and a shock tower RF) according to Example 4 of the present invention.

FIG. 45(a)-1 illustrates a press-formed part 161 of the B pillar 61 formed by a press forming while performing the rigidity improvement method. FIG. 45(a)-2 is a cross section taken along the line C-C of FIG. 45(a)-1. The solid line in FIG. 45(a)-2 indicates the press-formed part 161 and the broken line in FIG. 45(a)-2 indicates the shape of the B pillar 61 on which the method is not performed for comparison.

FIG. 45(b) illustrates a press-formed part 163 of the shock tower RF 63 formed by press forming while the rigidity improvement method is performed. A steel sheet having a thickness of 2.0 mm and strength of 590 MPa was used for the B pillar 61 and a steel sheet having a thickness of 0.7 mm and strength of 270 MPa was used for the shock tower RF 63.

As a method for verifying the rigidity, a rigidity analysis was performed on each part (the press-formed part 161 and the press-formed part 163) to calculate the rigidity improvement percentage in comparison with the results of a rigidity analysis obtained in the case where the rigidity improvement method was not performed. Here, the rigidity improvement percentage is represented by the following formula (1):

rigidity improvement percentage (%)=[(a rigidity value after performing the rigidity improvement method−a rigidity value before performing the rigidity improvement method)/a rigidity value before performing the rigidity improvement method]×100    (1).

Figure 50:
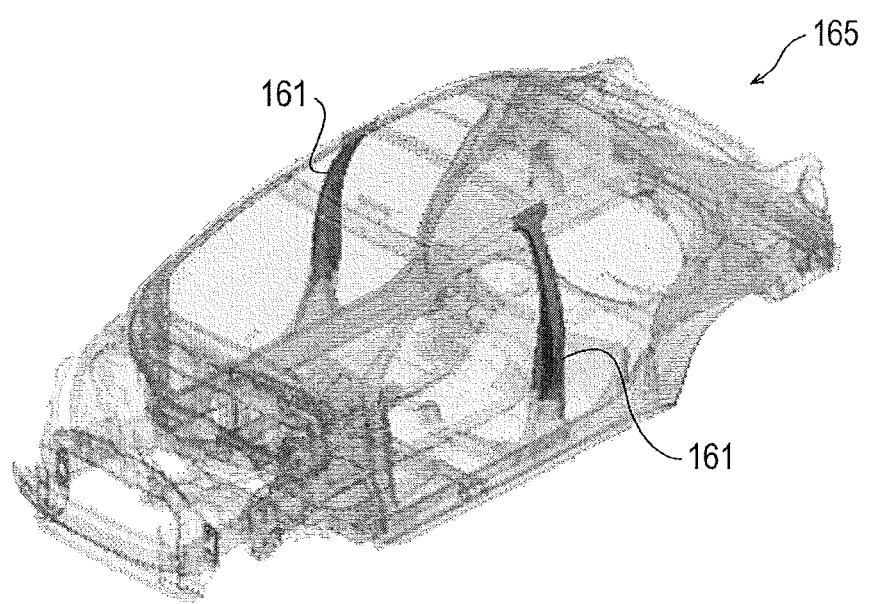
FIG. 50 is a diagram illustrating an experiment, different from the experiment illustrated using FIG. 47, conducted for confirming the rigidity improvement percentage of the B pillar illustrated in FIG. 45.
Figure 54:
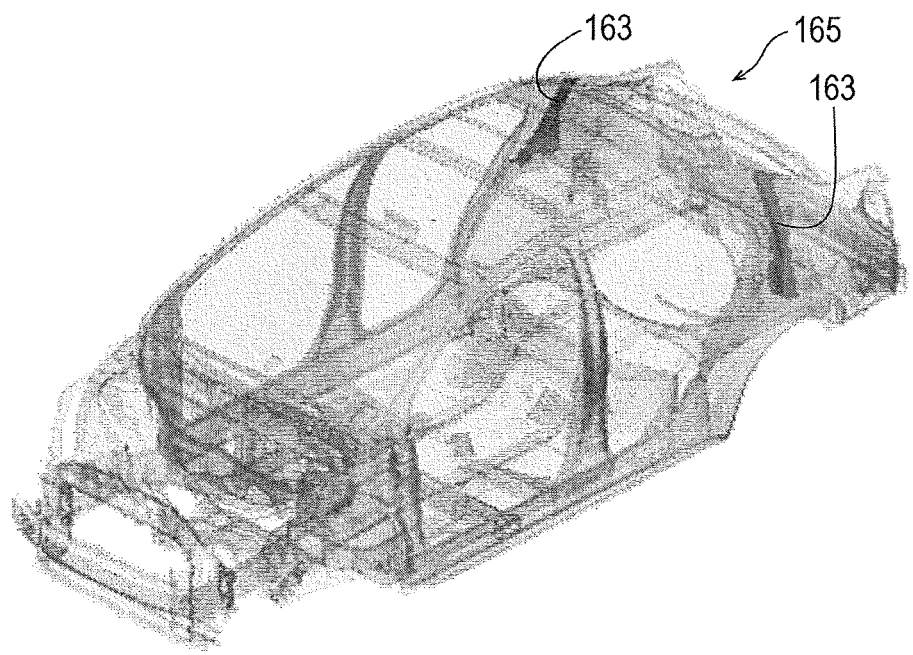
FIG. 54 is a diagram illustrating an experiment, different from the experiment illustrated using FIG. 51, conducted for confirming the rigidity improvement percentage of the shock toner RF illustrated in FIG. 45.

In the same manner as the rigidity improvement percentage for each part, the rigidity improvement percentage of the entire vehicle body was calculated while the parts (the press-formed part 161 and the press-formed part 163) were assembled into the vehicle body 165 (see FIG. 50 and FIG. 54).

Figure 46:
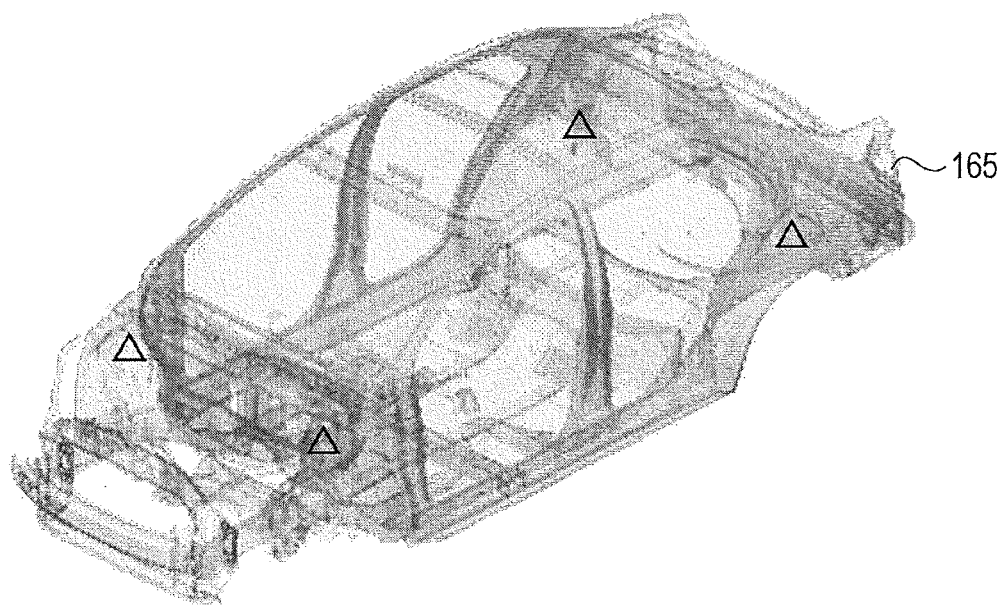
FIG. 46 is a diagram illustrating a vehicle body into which parts are assembled and an experiment conducted for confirming the rigidity improvement percentage of the springback-reduced parts illustrated in FIG. 45.

As illustrated in FIG. 46, the rigidity analysis of the entire vehicle body was performed in four different ways by changing a portion to which a torsional load is applied to a vehicle body. That is, the load is applied in turn to one of four portions of the vehicle body 165 indicated by four triangular marks in the drawing (coil supporting portions that support the vehicle body 165) while the remaining three portions are constrained. Then, all the obtained rigidity values were averaged for use in calculation of the rigidity improvement percentage.

First, the case of the B pillar 61 is described.

Figure 47:
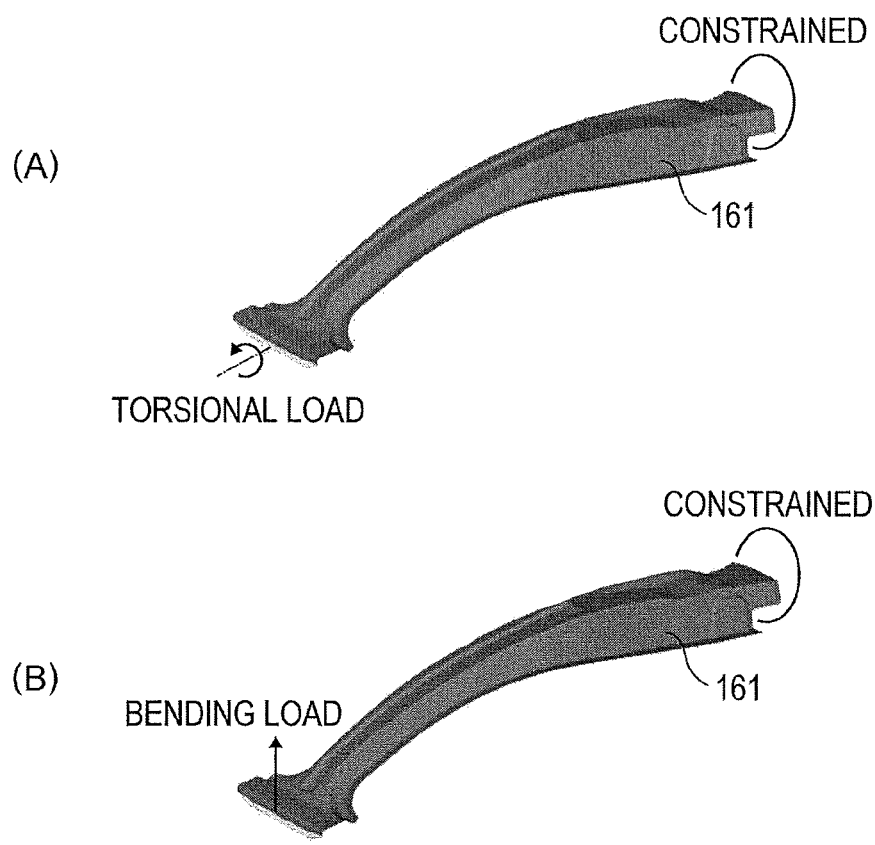
FIG. 47 is a diagram illustrating the experiment conducted for confirming the rigidity improvement percentage of the B pillar illustrated in FIG. 45.
Figure 48:
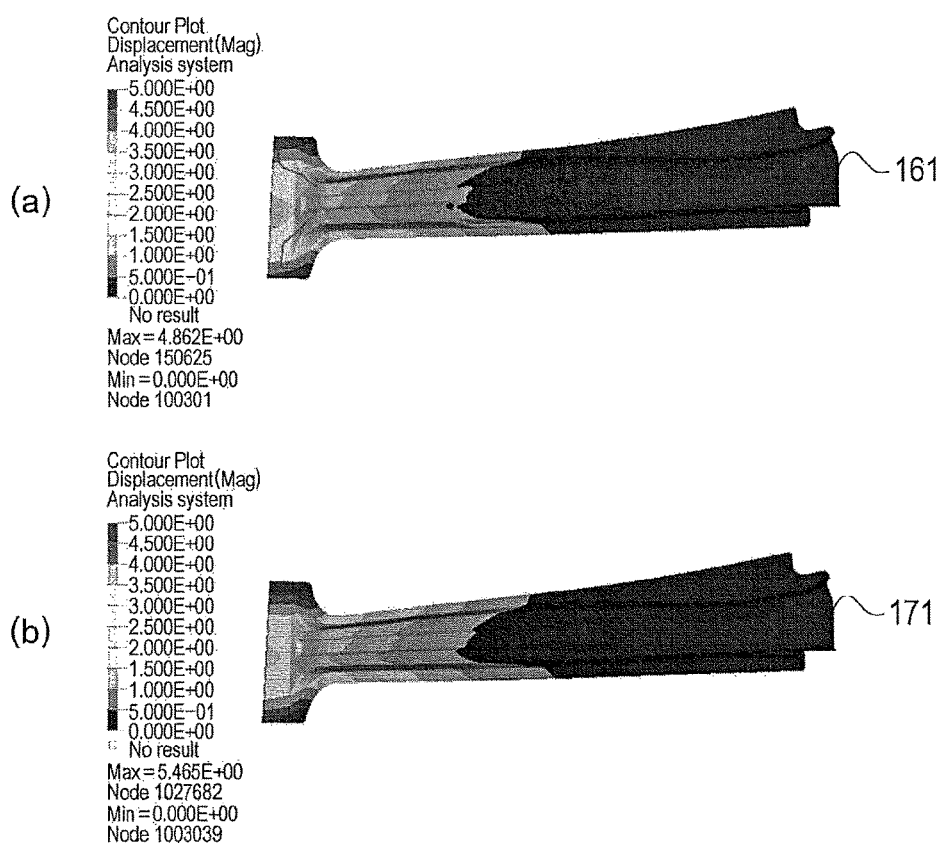
FIG. 48 is a diagram illustrating the result of the experiment illustrated using FIG. 47 (part 1).
Figure 49:
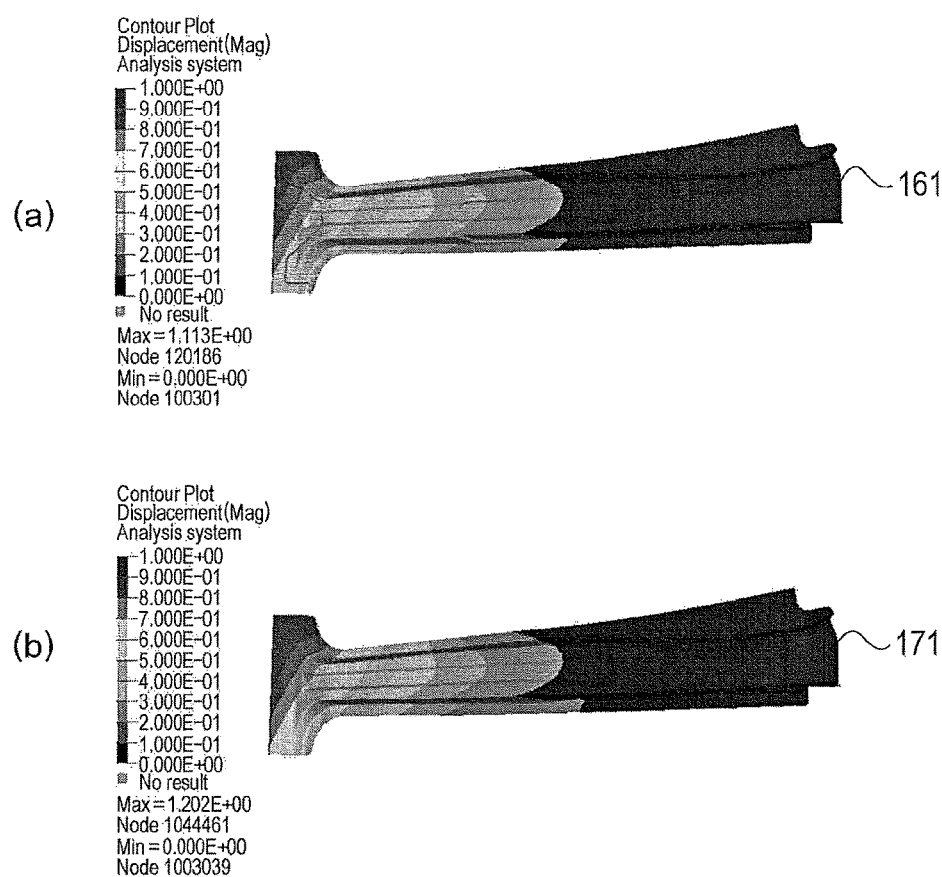
FIG. 49 is a diagram illustrating the result of the experiment illustrated using FIG. 47 (part 2).

Two types of rigidity analyses of the press-formed part 161 were performed: an analysis performed while a torsional load in the arrow direction of FIG. 47(A) is applied and an analysis performed under a condition of a bending load illustrated in FIG. 47(B). FIG. 48 illustrates the result of a torsional rigidity analysis and FIG. 49 illustrates the result of a flexural rigidity analysis. As a comparative example, a torsional rigidity analysis and a flexural rigidity analysis were similarly performed on a press-formed part 171 formed without performing the rigidity improvement method.

FIG. 48(a) illustrates the result of the torsional rigidity analysis performed on the press-formed part 161 on which the method according to the present invention has been performed. FIG. 48(b) illustrates the result of the torsional rigidity analysis performed on the press-formed part 171 on which the rigidity improvement method is not performed. The rigidity improvement percentage of the press-formed part 161 was 11.0% with respect to the press-formed part 171.

FIG. 49(a) illustrates the result of the flexural rigidity analysis performed on the press-formed part 161 and FIG. 49(b) illustrates the result of the flexural rigidity analysis performed on the press-formed part 171. The rigidity improvement percentage of the press-formed part 161 was 7.4% with respect to that of the press-formed part 171.

The rigidity analysis of the entire vehicle body was performed in a state where the press-formed parts 161 or 171 were assembled into the vehicle body 165 as illustrated in FIG. 50 and the average rigidity value against the vehicle body torsional load applied in the manner as described above with reference to FIG. 46 was calculated. The average rigidity value of the entire vehicle body in which the press-formed parts 171 on which the rigidity improvement method was not performed were assembled was 29.1 kN*m/deg whereas the average rigidity value of the entire vehicle body in which the press-formed parts 161 on which the method according to the present invention was performed were assembled was 29.4 kN*m/deg. The rigidity improvement percentage was 0.9%, which is a marked increase.

Now, the case of the shock tower RF 63 is described.

Figure 51:
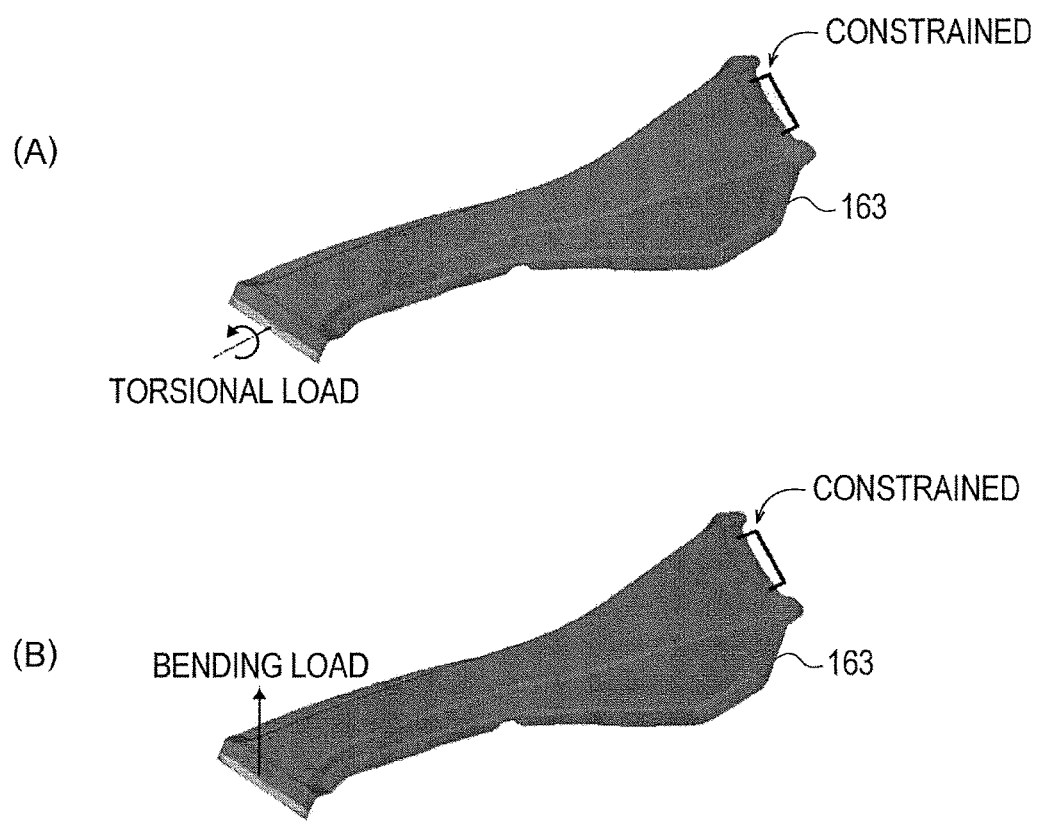
FIG. 51 is a diagram illustrating the experiment conducted for confirming the rigidity improvement percentage of the shock tower RF illustrated in FIG. 45.
Figure 52:
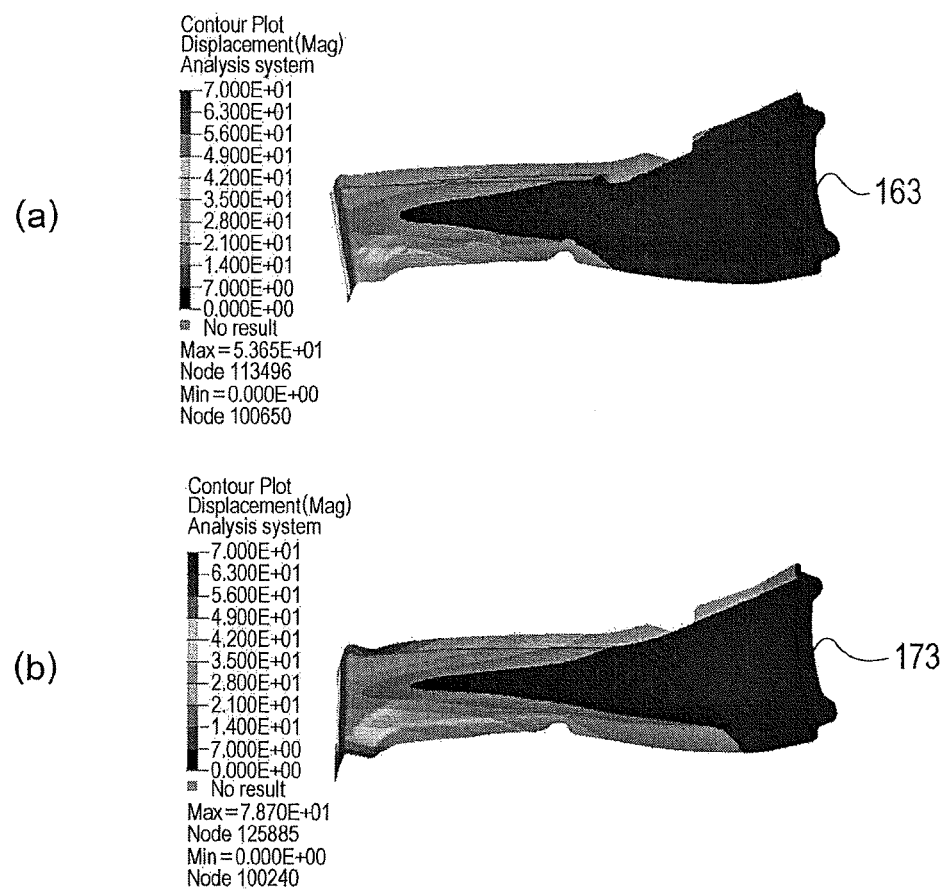
FIG. 52 is a diagram illustrating the result of the experiment illustrated using FIG. 51 (part 1).
Figure 53:
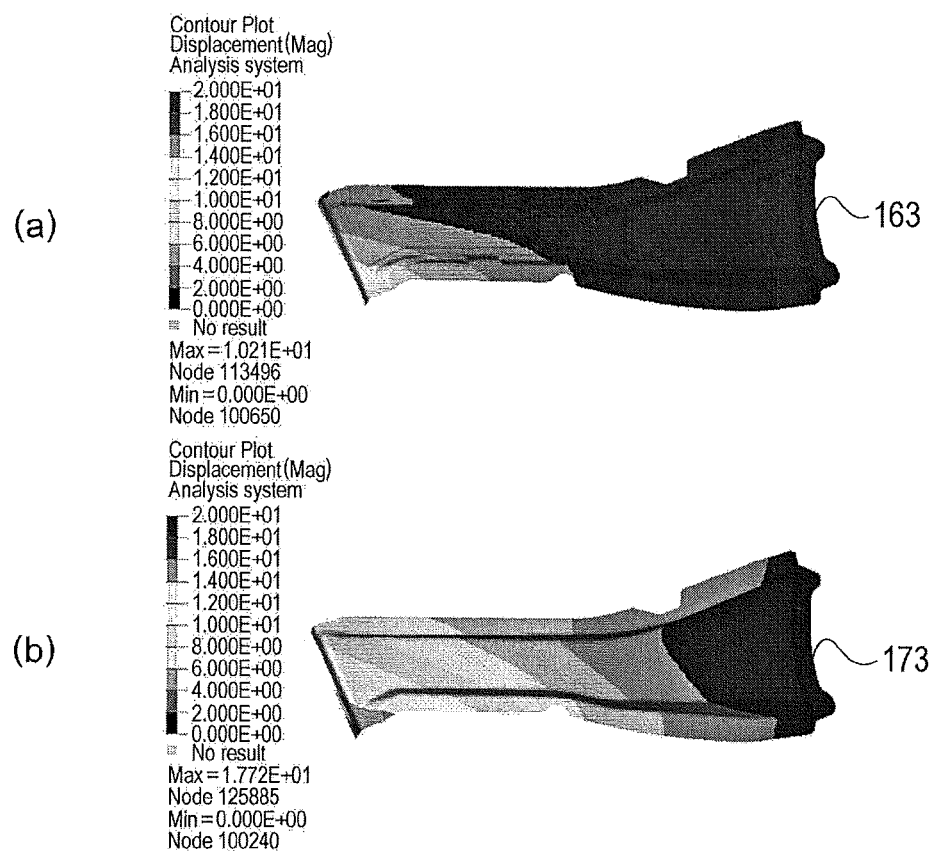
FIG. 53 is a diagram illustrating the result of the experiment illustrated using FIG. 51 (part 2).

As in the case of the B pillar 61, two types of the rigidity analysis of the press-formed part 163 were performed: an analysis performed while a torsional load illustrated in FIG. 51(A) is applied and an analysis performed under a condition of a bending load illustrated in FIG. 51(B). FIG. 52 illustrates the result of the torsional rigidity analysis and FIG. 53 illustrates the result of the flexural rigidity analysis. As a comparative example, the torsional rigidity analysis and the flexural rigidity analysis were similarly performed on a press-formed part 173 formed without performing the rigidity improvement method.

FIG. 52(a) illustrates the result of the torsional rigidity analysis performed on the press-formed part 163 on which the method according to the present invention has been performed. FIG. 52(b) illustrates the result of the torsional rigidity analysis performed on the press-formed part 173 on which the rigidity improvement method is not performed. The rigidity improvement percentage of the press-formed part 163 was 31.8% with respect to the press-formed part 173.

FIG. 53(a) illustrates the result of the flexural rigidity analysis performed on the press-formed part 163 and FIG. 53(b) illustrates the result of the flexural rigidity analysis performed on the press-formed part 173. The rigidity improvement percentage of the press-formed part 163 was 37.8% with respect to that of the press-formed part 173.

The rigidity analysis of the entire vehicle body was performed in a state where the press-formed parts 163 on which the method according to the present invention has been performed were assembled into the vehicle body 165 as illustrated in FIG. 54 and the average rigidity value against the vehicle body torsional load applied in the manner as described above with reference to FIG. 46 was calculated. For comparison, the rigidity analysis of the entire vehicle body was performed in a state where the press-formed parts 173 on which the improvement according to the present invention is not performed were similarly assembled into the vehicle body 165 and the average rigidity value was calculated.

The average rigidity value of the entire vehicle body was 29.1 kN*m/deg in the case where the press-formed parts 173 were assembled whereas the average rigidity value of the entire vehicle body was 30.0 kN*m/deg in the case where the press-formed parts 163 were assembled. The rigidity improvement percentage was 3.0%, which is a marked increase.

As described above, the method for reducing springback according to the present invention can improve the rigidity of a part (the B pillar 61 or, the shock tower RF 63) to a large degree by detecting a rigidity contributable portion of the part (the B pillar 61 or the shock tower RF 63) and on the basis of the rigidity contributable portion. As described above, the improvement in the rigidity of a part means that the springback is reduced.

In addition, it was confirmed that the improvement in the rigidity of each part leads to a marked improvement in the rigidity of the entire vehicle body when the part is assembled into the vehicle body 165.

REFERENCE SIGNS LIST

A, B corner
H depth
R edge
1 analyzing apparatus
3 display device
5 input device
7 main storage device
9 auxiliary storage device
11 processing unit
13 analytic model forming means
15 stressed-state setting means
17 rigidity-contributable-portion detecting means
19 rigidity improvement means
21 A pillar
23 analytic model
23a ceiling portion
23b punched hole
25 lower die
26 upper die
27 lower die
28 blank sheet
29, 31, 33, 35 press-formed part
41 blank sheet
41a specific portion
41b blanked hole
43 sheet member
45 tailored blank sheet
47 sheet member
49 tailored blank sheet
51 sheet member
53 reinforced blank sheet
61 B pillar
63 shock tower RF
71 blank sheet
71a rigidity contributable portion
71b blanked hole
73 sheet member
75 tailored blank sheet
77 press-formed part
81 sheet member
83 tailored blank sheet
85 press-formed part
91 sheet member
93 reinforced blank sheet
95 press-formed part
101 analytic model
101a rigidity contributable portion
103 blank sheet
103b blanked hole
105 sheet member
107 tailored blank sheet
109 press-formed part
111 sheet member
113 tailored blank sheet
115 press-formed part
121 sheet member
123 reinforced blank sheet
125 press-formed part
131 analytic model
133 blank sheet
133b blanked hole
135 sheet member
137 tailored blank sheet
139 press-formed part
141 sheet member
143 tailored blank sheet
145 press-formed part
151 sheet member
153 reinforced blank sheet
155 press-formed part
161 press-formed part on which the springback reduction method according to the present invention is performed
163 press-formed part on which the springback reduction method according to the present invention is performed
165 vehicle body

171 press-formed part on which the rigidity improvement method is not performed

173 press-formed part on which the rigidity improvement method is not performed

The invention claimed is:

1. A method for manufacturing a springback-reduced part, the method comprising:

an analytic model forming step including forming an analytic model of a press-formed part with elements, the elements including at least one of plane elements and solid elements;

a stressed-state setting step including setting each of the elements of the analytic model to a stressed state that causes a springback;

a rigidity-contributable-portion detecting step including performing an optimization analysis on the analytic model with the elements set to the stressed state in the stressed-state setting step to detect a portion of the press-formed part that contributes to the rigidity of the press-formed part;

a rigidity improving step including performing a rigidity improving method on a specific portion of a blank sheet on a basis of the portion of the press-formed part that contributes to the rigidity of the press-formed part, which is detected in the rigidity-contributable-portion detecting step; and a press-forming step including performing a press forming on the blank sheet, wherein:

the method reduces springback by increasing rigidity of the specific portion of the blank sheet without suppressing occurrence of residual stress during press forming of the part;

the optimization analysis includes analyzing the analytic model of the press-formed part to leave minimum elements required for satisfying given analytic conditions and determining the portion of the press-formed part that contributes to the rigidity of the press-formed part so as to only include the minimum elements; and the rigidity improving method in the rigidity improving step is performed by removing the specific portion of the blank sheet to make a removed portion and fitting a member having a Young's modulus higher than a Young's modulus of the specific portion of the blank sheet into the removed portion such that the member is integrated with the blank sheet.

2. The method for manufacturing the springback-reduced part according to claim 1, wherein the rigidity improving method in the rigidity improving step further comprises using a die to provide at least one of a protruding shape and a recessed shape to the member.

3. The method for manufacturing the springback-reduced part according to claim 1, wherein the member has a thickness larger than a thickness of the specific portion of the blank sheet.

4. The method for manufacturing the springback-reduced part according to claim 1, wherein the rigidity improving method in the rigidity improving step further comprises bonding another sheet to the member.

* * * * *